(12) United States Patent
Husar

(10) Patent No.: US 11,422,063 B2
(45) Date of Patent: Aug. 23, 2022

(54) APPARATUS FOR ANALYZING OR MONITORING A ROTATING ELEMENT AND CORRESPONDING METHOD

(71) Applicants: Fraunhofer-Gesellschaft zur Foerderung der angewandten Forschung e.V., Munich (DE); Technische Universitaet Ilmenau, Ilmenau (DE)

(72) Inventor: Peter Husar, Ilmenau (DE)

(73) Assignees: Fraunhofer-Gesellschaft zur Foerderung der angewandten Forschung e.V., Munich (DE); Technische Universitaet Ilmenau, Ilmenau (DE)

( * ) Notice: Subject to any disclaimer, the term of this patent is extended or adjusted under 35 U.S.C. 154(b) by 16 days.

(21) Appl. No.: 16/514,846

(22) Filed: Jul. 17, 2019

(65) Prior Publication Data
US 2019/0339163 A1    Nov. 7, 2019

Related U.S. Application Data

(63) Continuation of application No. PCT/EP2018/051187, filed on Jan. 18, 2018.

(30) Foreign Application Priority Data

Jan. 18, 2017  (DE) .................... 10 2017 200 761.3

(51) Int. Cl.
*G01M 13/045*  (2019.01)
*F16C 19/52*  (2006.01)

(52) U.S. Cl.
CPC ......... *G01M 13/045* (2013.01); *F16C 19/527* (2013.01); *F16C 2233/00* (2013.01)

(58) Field of Classification Search
CPC .. G01M 13/045; F16C 19/527; F16C 2233/00
See application file for complete search history.

(56) References Cited

U.S. PATENT DOCUMENTS

| | | | | |
|---|---|---|---|---|
| 5,744,723 A | * | 4/1998 | Piety | G01P 3/44 |
| | | | | 702/145 |
| 2010/0256953 A1 | * | 10/2010 | Kar | G05B 23/0221 |
| | | | | 702/185 |

(Continued)

FOREIGN PATENT DOCUMENTS

| CN | 105806613 A | * | 7/2016 |
|---|---|---|---|
| CN | 105806613 A | | 7/2016 |

(Continued)

OTHER PUBLICATIONS

Translation from Espacenet.com of CN-105806613-A, Chen Haoran "Planetary gear case fault diagnosis method based on ordeer complexity" (Year: 2016).*

(Continued)

*Primary Examiner* — Eman A Alkafawi
*Assistant Examiner* — Aeysha N Sultana
(74) *Attorney, Agent, or Firm* — Perkins Cole LLP; Michael A. Glenn

(57) ABSTRACT

An apparatus for analyzing an element rotating at a rotational speed based on an vibration signal originating from the rotating element has: an analysis function processor for forming a plurality of analysis functions, the analysis function processor configured to form each analysis function based on an analysis frequency, on the vibration signal or on a measured or estimated rotational speed and on a predetermined order factor differing for each analysis function; a correlator configured to calculate a correlation result from the vibration signal and each analysis function, each correlation result being associated to the order factor which the analysis function, with which the correlation result was (Continued)

calculated, is based on, and the correlation results representing a correlation function; and an examiner configured for examining the correlation function or examining information derived from the correlation function so as to make a statement on a state of the rotating element.

13 Claims, 16 Drawing Sheets

(56)  References Cited

U.S. PATENT DOCUMENTS

| | | | |
|---|---|---|---|
| 2015/0210259 A1* | 7/2015 | Agnew | B60T 13/14 |
| | | | 701/41 |
| 2016/0282224 A1* | 9/2016 | Takada | H04M 1/72469 |
| 2016/0334302 A1 | 11/2016 | Barikmo | |
| 2019/0293483 A1* | 9/2019 | Duke | G01P 3/48 |

FOREIGN PATENT DOCUMENTS

| | | |
|---|---|---|
| CN | 106289774 A | 1/2017 |
| DE | 2541176 A1 | 3/1977 |
| DE | 19954066 C1 | 10/2001 |
| EP | 2730906 A2 | 5/2014 |
| JP | H11311582 A | 11/1999 |
| JP | 2002098584 A | 4/2002 |

OTHER PUBLICATIONS

Klein, Ulrich, "Schwingungsdiagnostische Beurteilung von Maschinen und Anlagen", 2. Ausgabe. Düsseldorf: Stahleisen GmbH, 2000. 25-50.-ISBN 3-514-00663-6.

Wikipedia, "Kreuzkorrelation", Version vom Oct. 11, 2016, Seite 1-3.

Wikipedia, "Lock-in-Verstarker", Version vom Nov. 24, 2016, Seite 1-4.

* cited by examiner $$h(t, \tau, s) = \exp[j\, 2\pi\, s\, f\, t + j\, s\, r\, (t + \tau)]$$

$1^{st}$ term $2 \cdot \pi \cdot s\, f\, t$ — 41

42 s: order factor
f: analysis factor $2^{nd}$ Term $s \cdot r\,(t + \tau)$ $r\,(t + \tau)$: temporally variable phase
$\tau$: time shift (may equal 0)

<u>discrete</u> for an analysis window: $n = 1 \ldots N$ $$h(n, \tau, s) = \exp[j\, 2\pi\, s\, f\, n + j\, s\, r\,(n + \tau)]$$

$$s \cdot r(n+\tau) = s \cdot 2\pi \sum_{1}^{n} x(n) / f_s$$

$f_s$: sample frequency for vibration signal
$x(n)$: sample value of the vibration signal for time n in the analysis window

Fig. 10

$$\overline{\rho}_1 = \overbrace{[x_1, ...., x_n]}^{VS} \cdot \overbrace{\begin{bmatrix} RE_1 & IM_1 \\ \vdots & \\ \vdots & \\ RE_n & IM_n \end{bmatrix}}^{AF_1}$$

RE: real part
IM: imaginary part

Fig. 17a $$\rho_1 = |\overline{\rho}_1| = \\ = \sqrt{\rho_{RE}^2 + \rho_{IM}^2};$$

Fig. 17b $$\rho_{RE} = x_1 \cdot RE_1 + x_2 \cdot RE_2 + x_3 \cdot RE_3 + ... \, x_n \cdot RE_n$$
$$\rho_{IM} = x_1 \cdot IM_1 + x_2 \cdot IM_2 + x_3 \cdot IM_3 + ... \, x_n \cdot IM_n$$

Fig. 17c

APPARATUS FOR ANALYZING OR MONITORING A ROTATING ELEMENT AND CORRESPONDING METHOD

CROSS-REFERENCE TO RELATED APPLICATIONS

This application is a continuation of copending International Application No. PCT/EP2018/051187, filed Jan. 18, 2018, which is incorporated herein by reference in its entirety, and additionally claims priority from German Application No. 10 2017 200 761.3, filed Jan. 18, 2017, which is also incorporated herein by reference in its entirety.

BACKGROUND OF THE INVENTION

The invention relates to an apparatus for analyzing or monitoring a rotating element. Furthermore, the invention relates to a method for analyzing or for monitoring a rotating element.

In known technology, diagnostics for state monitoring of machines or elements and the detection of defects are based on detecting solid-borne sound and evaluating the same (see, for example, EP 2 730 906 A2 or DE 199 54 066 C1). The vibrations are frequently recorded directly from the surface of the machine by means of an electromechanical transducer. At times, lasers are used for a contact-free detection of the solid-borne sound (laser microphone).

Important diagnostic means when evaluating the measuring signals is the so-called order spectrum which is a variation of the conventional frequency spectrum and is used for scaling the rotational speed or number of revolutions. This allows detecting defects using the frequency or time normalized to the current rotational speed, thereby not being dependent on the absolute frequency. Usually, the envelope of high-frequency vibrations (so-called "envelope detection") which, as far as signal theory is concerned, corresponds to an amplitude demodulation, is used for calculating the order spectrum.

Since an amplitude demodulator, from the point of view of detection theory, is an energy detector, a minimum SNR (signal-to-noise ratio) of +10 dB is used. Even with a good SNR above this value, the amplitude demodulation causes a non-linear distortion of the spectrum. This may result in erroneous detections (erroneously positive detection, erroneous warning) in the order spectrum.

In reality, the SNR for beginning defects (like a crack in a roller bearing) is up to −60 dB (i.e. about $10^7$ times weaker than the value used for envelope demodulation) so that the conventional methods cannot detect the defect. However, it is precisely this range which is of diagnostic importance for state monitoring or early defect recognition.

The problem of a weak signal-to-noise ratio can partly be solved by integral transforms in the frequency range (like Hilbert, Fourier, Wavelet transform, direct bispectrum/trispectrum). However, this works only with the precondition of a constant rotational speed for a period of up to half an hour. However, this condition can only very rarely be kept to in practice.

SUMMARY

According to an embodiment, an apparatus for analyzing an element rotating at a rotational speed based on a vibration signal originating from the rotating element may have: analysis function means for forming a plurality of analysis functions, the analysis function means being configured to form each analysis function based on an analysis frequency, based on the vibration signal or based on a measured or estimated rotational speed and based on a predetermined order factor, the predetermined order factor differing for each analysis function; correlation means for calculating a correlation function, the correlation means being configured to calculate a correlation result from the vibration signal and each analysis function, each correlation result being associated to the order factor which the analysis function, with which the correlation result was calculated, is based on, and the correlation results representing the correlation function; and examining means for examining the correlation function or for examining information derived from the correlation function so as to make a statement on a state of the rotating element.

According to another embodiment, a method for analyzing an element rotating at a rotational speed on the basis of a vibration signal originating from the rotating element may have the steps of: forming a plurality of analysis functions, the analysis function means being configured to form each analysis function based on an analysis frequency, based on the vibration signal or based on a measured or estimated rotational speed and based on a predetermined order factor, the predetermined order factor differing for each analysis function; calculating a correlation function, the correlation means being configured to calculate a correlation result from the vibration signal and each analysis function, each correlation result being associated to the order factor which the analysis function is based on with which the correlation result was calculated, and the correlation results representing the correlation function; and examining the correlation function or for examining information derived from the correlation function in order to make a statement on a state of the rotating element.

Still another embodiment may have a non-transitory digital storage medium having stored thereon a computer program for performing a method for analyzing an element rotating at a rotational speed on the basis of a vibration signal originating from the rotating element, having the steps of: forming a plurality of analysis functions, the analysis function means being configured to form each analysis function based on an analysis frequency, based on the vibration signal or based on a measured or estimated rotational speed and based on a predetermined order factor, the predetermined order factor differing for each analysis function; calculating a correlation function, the correlation means being configured to calculate a correlation result from the vibration signal and each analysis function, each correlation result being associated to the order factor which the analysis function is based on with which the correlation result was calculated, and the correlation results representing the correlation function; and examining the correlation function or for examining information derived from the correlation function in order to make a statement on a state of the rotating element, when said computer program is run by a computer.

An apparatus for analyzing an element rotating at a rotational speed based on a vibration signal originating from the rotating element comprises analysis functional means for forming a plurality of analysis functions, each analysis functional means being configured to form each analysis function based on an analysis frequency, based on the vibration signal and based on a predetermined order factor. The predetermined order factor is different for every analysis function so that the individual analysis functions are all mutually different. Additionally, the apparatus comprises correlation means for calculating a correlation function, the correlation means being configured to calculate a correlation result each from the vibration signal and each analysis function, wherein each correlation result is associated to the order factor which the analysis function, using which the correlation result has been calculated, is based on, and wherein the correlation results together represent the correlation function. In addition, examining means is provided for examining the correlation function or a representation derived from the correlation function so as to make a statement on a state of the rotating element.

The rotating element may, for example, be a machine or an element of a machine (like a ball bearing).

An embodiment relates to an apparatus for monitoring a rotating element. Thus, the apparatus comprises a vibration sensor and an evaluation device. The vibration sensor is implemented to generate a time-dependent vibration signal starting from vibrations of the rotating element. The evaluation device is implemented to establish a statement on a state of the rotating element using the vibration signal and using a time-dependent rotational speed of the rotating element and/or using a value dependent on a time-dependent rotational speed of the rotating element. In addition, the evaluation device is implemented to correlate the vibration signal with a harmonic analysis function dependent on a predeterminable starting frequency and on the rotational speed and/or a value dependent on the rotational speed, while inserting a predeterminable time shift between the vibration signal and the analysis function and to establish the statement on the state of the rotating element starting from an evaluating function obtained by cross-correlation. In addition, the evaluation device is implemented to vary values of the starting frequency and/or time shift when establishing the statement on the state of the rotating element.

The evaluation device is implemented to establish a statement on a state of the rotating element using the vibration signal and using a time-dependent rotational speed of the rotating element. Alternatively or additionally, the evaluation device is implemented to establish a statement on a state of the rotating element using the vibration signal and using a value dependent on a time-dependent rotational speed of the rotating element.

The evaluation device correlates (advantageously cross-correlates) the vibration signal with a harmonic analysis function, which is dependent on a predeterminable starting frequency and on the rotational speed and/or a value dependent on the rotational speed. Thus, the evaluation device inserts a predeterminable time shift between the vibration signal and the analysis function. Starting from an evaluation function obtained by cross-correlation, the evaluation device then establishes the statement on the state of the rotating element. The values for the time shift and/or the starting frequency here are predetermined by the evaluation device by means of variation.

The value dependent on the time-dependent rotational speed of the rotating element in one implementation is a time-dependent phase of rotations of the element and results as an integral value of the rotational speed. The dependent value here is also time-dependent.

The time-dependent vibration signal is exemplarily referred to by $x(t)$. The time-dependent rotational speed of the element is exemplarily referred to by $z(t)$. The value dependent on the time-dependent rotational speed is exemplarily referred to by $r(t)$. Time generally is referred to by t. The starting frequency is exemplarily referred to by the Greek small letter $\nu$. The time shift is exemplarily referred to by the Greek small letter $\tau$. The analysis function is exemplarily referred to by $h(t)$. The evaluation function is referred to by $y(t, \tau, \nu)$.

Generally, the invention enables a solid-borne sound-based detection of defects in rotating parts, machines or, generally, elements. This is particularly also possible with a low signal-to-noise ratio.

One implementation is for the apparatus to additionally comprise a rotation sensor. Thus, the rotation sensor is implemented to measure the rotational speed and/or the value dependent on the rotational speed. When the vibration sensor detects the vibrations of the element considered, the rotation sensor will establish the rotational speed of the element or a value dependent on the rotations.

In one implementation, it is provided for the evaluation device to be implemented to establish the rotational speed and/or the value dependent on the rotational speed using a time-frequency distribution of the vibration signal. In this implementation, the rotational speed, or a value dependent thereon, is not measured, but calculated.

One implementation is for the evaluation device to be implemented to establish a deviation from a set state of the rotating element as a statement on the state of the rotating element. The set state is exemplarily described by a shape of the vibration signal and maybe supplemented by a tolerance band.

In one implementation, it is provided for the evaluation device to be implemented to achieve the evaluation function by means of convoluting the vibration signal using the time-mirrored analysis function.

The following implementations refer to the analysis function used by the evaluation device. One implementation is for the evaluation device to be implemented to use an analysis function which is dependent at least on a time-dependent phase of rotations as an integral value of the rotational speed, and on the starting frequency. Thus, in this implementation, the time-dependent phase of rotations is the value dependent on the rotational speed.

In one implementation, it is provided for the evaluation device to be implemented to use an analysis function which is dependent at least on an exponential function having an argument dependent on a product of a time-dependent phase of rotations as an integral value of the rotational speed and the starting frequency.

One implementation is for the evaluation device to be implemented to use an analysis function which is dependent at least on the following exponential function: $\exp(j\, f\, s\, r(t))$
Thus, the following applies:
j being the imaginary unit,
f being a predeterminable frequency value, and
s being a predeterminable scaling factor or order factor.
Additionally, $r(t)$ is a time-dependent phase of rotations as an integral value of the rotational speed $z(t)$.

Finally, the predeterminable starting frequency equals a product of the predeterminable frequency value (referred to by f) and the predeterminable scaling factor or order factor (referred to by s).

The following implementations relate to evaluating the evaluation function by the evaluation device. Thus, in one implementation, the evaluation function is dependent on time, starting frequency and time shift.

In one implementation, it is provided for the evaluation device to be implemented to establish a maximum correlation and/or a maximum signal energy of the evaluation function.

One implementation is for the evaluation device to be implemented to establish the maximum correlation and/or the maximum signal energy of the evaluation function for several combinations of the varied values of the starting frequency and/or time shift. This means that, in this implementation, the starting frequency and/or time shift is/are varied and the respective resulting evaluation functions are evaluated as to their statement on the state of the element.

In one implementation, it is provided for the evaluation device to be implemented to generate an order spectrum from evaluating the evaluation function and/or identify an order of defects of the rotating element.

One implementation is for the evaluation device to be implemented to establish, when evaluating the evaluation function, spectra starting from the third order.

In addition, the invention achieves the object by a method for monitoring a rotating element.

Thus, the method comprises at least the following steps:
generating a time-dependent vibration signal starting from vibrations of the rotating element,
establishing a statement on a state of the rotating element using the vibration signal and using a time-dependent rotational speed of the rotating element and/or using a value dependent on a time-dependent rotational speed of the rotating element.

Establishing the statement on the state of the rotating element here takes place as follows:
by correlating the vibration signal with a harmonic analysis function dependent on a predeterminable starting frequency and on a rotational speed and/or on a value dependent on the rotational speed while inserting a predeterminable time shift between the vibration signal and the analysis function,
by establishing the statement on the state of the rotating element starting from an evaluation function obtained by cross-correlation, and
by varying values of the starting frequency and/or time shift.

Thus, the analysis function is dependent on a predeterminable starting frequency and on the rotational speed. Alternatively or additionally, the analysis function is dependent on a predeterminable starting frequency and on a value dependent on the rotational speed. Furthermore, the starting frequency and/or the time shift is/are varied for the correlation so that the results are correspondingly differing evaluation functions for an evaluation as regards the statement on the state of the element.

The above explanations and implementations relating to the apparatus apply in analogy to the inventive method. Inversely, method steps may also be realized by implementations of the apparatus so that the explanations relating to the method apply to the apparatus as well.

BRIEF DESCRIPTION OF THE DRAWINGS

Embodiment of the present invention will be detailed subsequently referring to the appended drawings, in which:

FIG. 10 shows an explanation of the different analysis functions in accordance with an embodiment;

FIG. 17a shows an illustration of determining a correlation result with a complex analysis function;

FIG. 17b shows an illustration of calculating a real correlation result;

FIG. 17c shows an illustration of calculating the real part and the imaginary part of the complex correlation result.

DETAILED DESCRIPTION OF THE INVENTION

Figure 1:
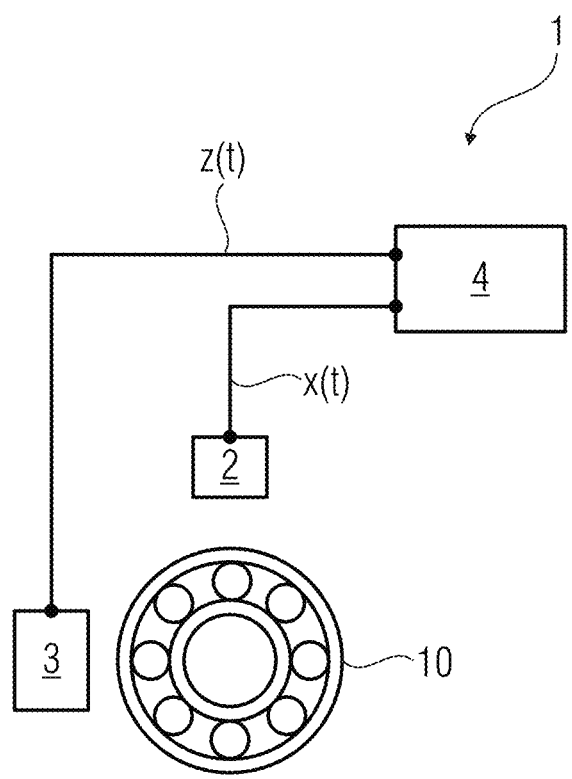
FIG. 1 is a schematic illustration of an inventive apparatus in combination with an element.

FIG. 1 shows monitoring of a rotating element 10 by an apparatus 1. The element 10 may, for example, be a ball bearing.

The apparatus 1 comprises a vibration sensor 2 and an evaluation device 4. Additionally, there is a rotation sensor 3 in the implementation illustrated.

The vibration sensor 2 generates a time-dependent vibration signal: x(t), describing the vibrations of the rotating element 10. The rotations/revolutions of the element 10 are detected, in the implementation shown, by means of measuring technology (alternatively, this may, for example, be done by evaluating the vibrations of the element 10), wherein, in the implementation shown, the rotation sensor 3 detects the time-dependent rotational speed of the element 10 and generates the measuring signal of the time-dependent rotational speed z(t).

The vibration signal x(t) and the rotational speed z(t) are transferred to the evaluation device 4 in order to be processed there for establishing a statement on the state of the rotating element 10. Details of processing will be discussed below.

Figure 2:
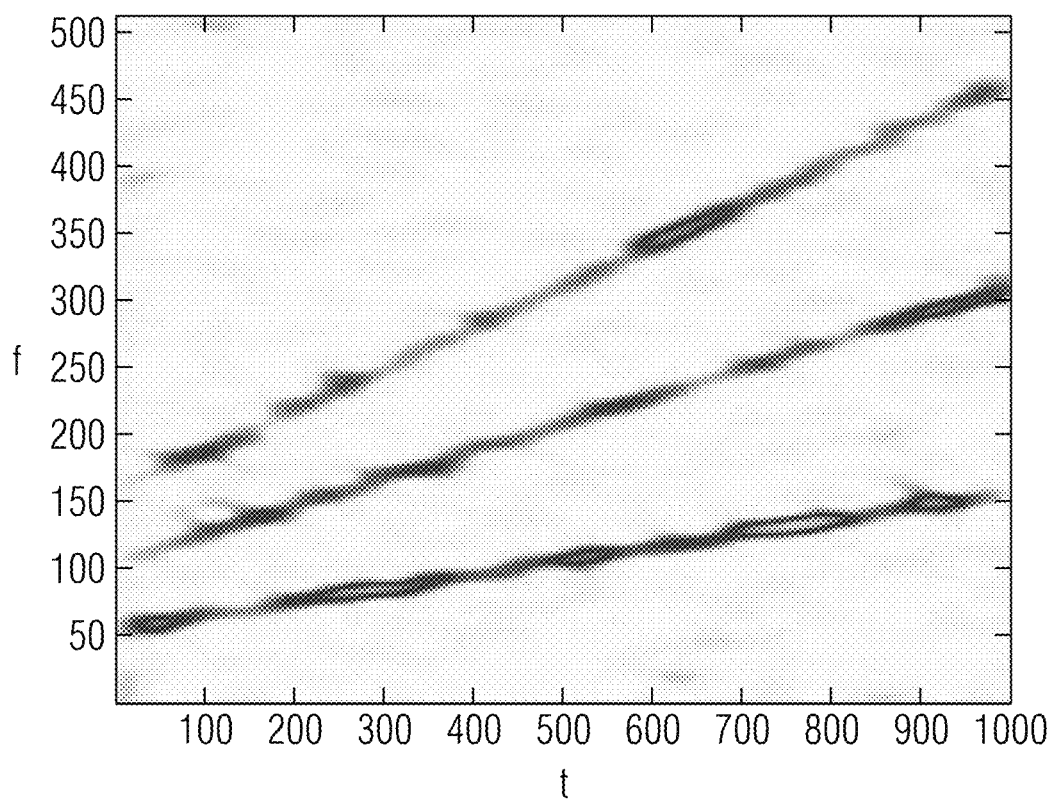
FIG. 2 shows a spectrogram of simulated solid-borne sound of a starting machine.

The diagram in FIG. 2 where time is plotted on the x axis and frequency is plotted the y axis, shows a simulation, close to reality, of the solid-borne sound of a starting machine. With the simulated SNR=1.7 dB, envelope demodulation and integral transforms pursuant to Hilbert and Fourier will fail. No detection is possible, not even in the spectrogram. This clearly shows the necessity for this invention.

The invention allows evaluating very weak vibration signals (SNR of less than +10 dB and up to −60 dB) of a sound recorder or, generally, vibration sensor (like acceleration sensor, laser microphone, vibration sensor, geometry sensor) under the conditions of a temporally variable rotational speed aiming at identifying defects in a rotating element (rotating device or rotating machine, etc.).

A temporally variable analysis function is defined at first for this description:

$$h(t)=\exp(jfsr(t)) \qquad (1)$$

The following terms are used here:
j being the imaginary unit
r(t) being the temporally variable phase after the revolutions occurred up to a time t, during the analysis time; consequently, this is the time integral in relation to the rotational speed z(t), wherein z(t)=dr(t)/dt applies
f being the starting value of the analysis frequency (or a differently defined frequency value)
s being a real-value scaling factor or order factor in the frequency range.

The connection between the rotational speed z(t) and the temporally variable phase r(t) is a value dependent of the rotational speed:

$$z(t)=dr(t)/dt \qquad (1.1)$$

In formula (1), both conventional trigonometrical functions of sine and cosine, and their orthogonal combination in the complex numbers range are contained implicitly.

Figure 3:
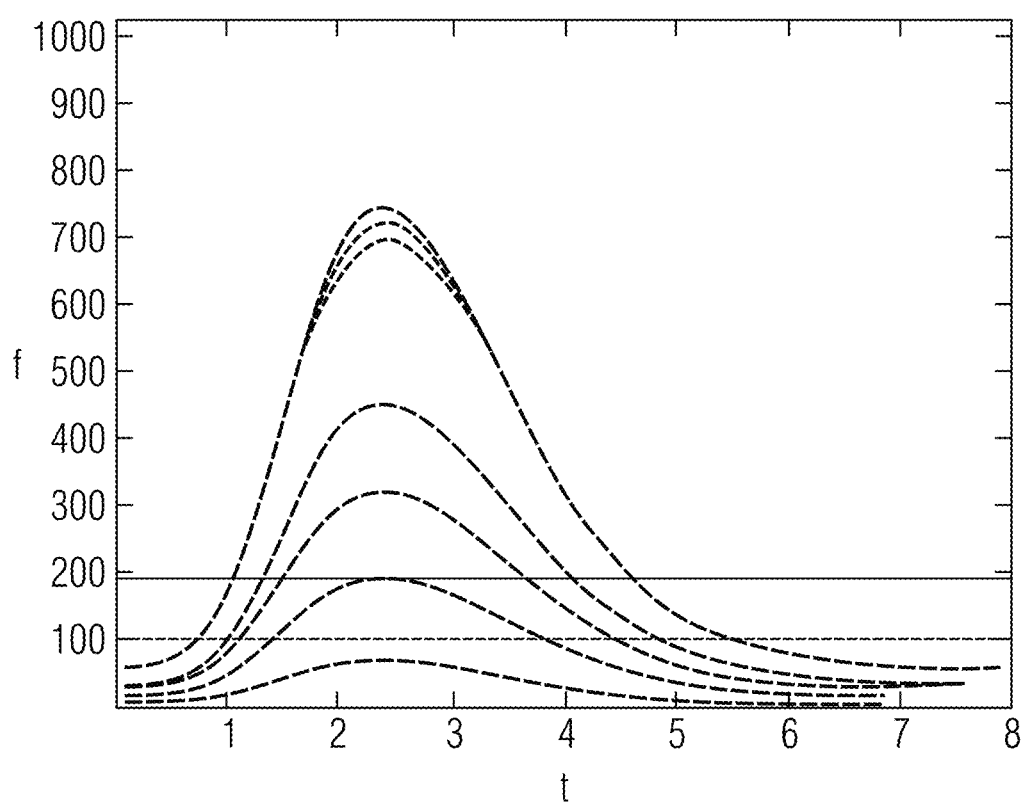
FIG. 3 shows a time-frequency distribution of a rotating machine.

The diagram of FIG. 3 shows a simulated time-frequency distribution (TFD, in particular SPWD, smoothed pseudo-Wigner distribution), close to reality, of a rotating machine, wherein time is plotted on the x-axis and frequency is plotted on the y-axis. It can be seen that frequencies not dependent on the rotational speed (i.e. constant) and waveforms which are dependent on the rotational speed (i.e. temporally variable) superimpose one another in an additive manner.

All the important details—both components which are not dependent on the rotational speed (i.e. frequency-constant) and (modulated) harmonics of the rotational speed—are visible and can be identified clearly. It becomes obvious from this illustration that the information on the absolute phase r(t) from formula (1) and on the rotational speed z(t) pursuant to formula (1.1) can—as an alternative to direct measurement—be established from the TFD.

In order to identify statistically detectable harmonics of the rotational speed (orders) in such signals, referencing to defects, an envelope detection is not sufficient for such examples with an SNR of 9 dB. This illustrates the demand for the invention.

Real-numbered harmonics of the rotational speed z(t) (in expert language of vibration analysis: "orders" or "significant levels in the order spectrum") in the vibration signal x(t) are searched. Thus, the correlation between the analysis function h(t) and the vibration signal x(t) can be calculated as follows:

$$\rho=\int x(t) \cdot h(t) dt \qquad (2)$$

In most cases, there are discretized signals so that the result is a correlation of the scalar product of the vectors (column vectors) of the vibration signal x and the analysis function h (bold small letters identify vectors, the superscript capital T represents transposition):

$$\rho=X \cdot h^T \qquad (3)$$

Generally, the time shift between a vibration signal x(t) and an analysis function h(t) is unknown. The analysis function h(t) frequently is a discrete-time vector of DFT (discrete Fourier transform) or STFT (short-time Fourier transform) for the spectrogram. Thus, the correlation is examined here in dependence on the time shift τ.

Thus, the CCF (cross-correlation function) is established, which corresponds to convoluting the vibration signal x(t) with the temporally mirrored analysis function h(t):

$$y(\tau)=\int x(\tau) \cdot h(t+\tau) d\tau = x(t)*h(-t) = \int x(t) \cdot h(t-\tau) dt \qquad (4)$$

The signal y(τ) represents the CCF of the vibration signal x(t) and the analysis function h(t) in dependence on the time shift τ and can consequently also be interpreted as the output signal of an optimum filter (matched filter, MF). The coefficients of the optimum filter correspond to the temporally mirrored analysis function of formula (1) in the discrete-time range, h(−t).

Since the orders in the spectrum have real values and the information on the current rotational speed z(t) and on the real time shift τ are unknown, the evaluation function y(t) is extended by a translation in time and scaling in frequency:

$$y(t,\tau,\nu)=x(t+\tau) \cdot h(t,\nu) \qquad (5)$$

or $$y(t,\tau,s)=x(t+\tau) \cdot h(t,s) \qquad (5a)$$

Thus, τ is the unknown time shift between the measured signal x(t) and the rotational speed z(t), ν is the predeterminable (starting) frequency of the analysis function h(t) pursuant to formula (1) and corresponds to the absolute frequency f scaled by s:

$$\nu=s \cdot f$$

The starting frequency ν thus also corresponds to a frequency shift.

Thus, formula (5)—for example for a real-time correlation analysis and/or for optimum filtering—can be integrated relative to the current time t (also τ) pursuant to formula (4).

The evaluation function y(t, τ, ν) or y(t, τ, s) is, as regards its variables, three-dimensional so that the energy detector or evaluation device is to be adjusted correspondingly for searching defects.

In one implementation, the evaluation device is based on the signal y(t, τ, ν) pursuant to formula (5) reaching its maximum energy when the real values of time shift t and frequency time shift ν, present at the time t examined, are obtained.

The function pursuant to formula (5) is alternatively interpreted as a three-dimensional correlation between the analysis function h(t), pursuant to formula (1), frequency-shifted by ν or s and the vibration signal x(t) shifted by τ.

Figure 4:
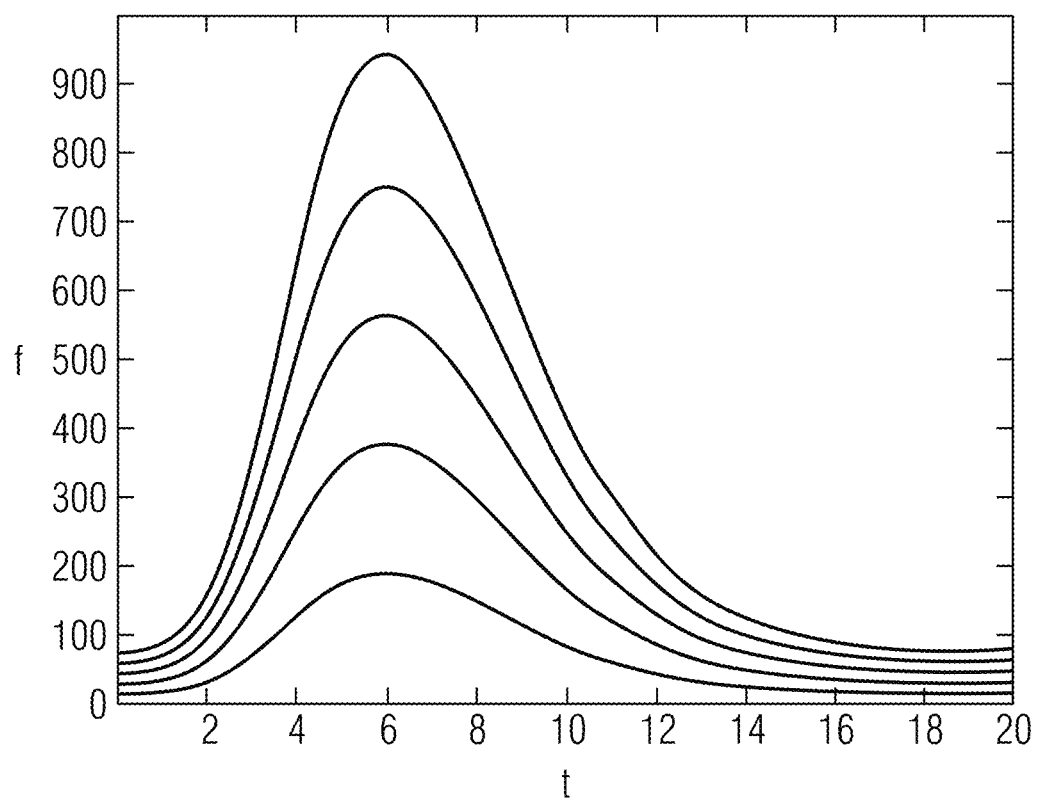
FIG. 4 shows a diagram indicating the magnitudes of the analysis functions of the curves of FIG. 3

An exemplary set of analytical functions for the signal of FIG. 3 is shown in the diagram of FIG. 4. Illustrated is the magnitude of the complex analytical functions for the signal of FIG. 3 for integer scalings s=1, 2, 3, 4, 5 with a starting frequency ν=10 Hz and τ=0. Correlations with the vibration signal x(t) are calculated using these analysis functions.

Figure 5:
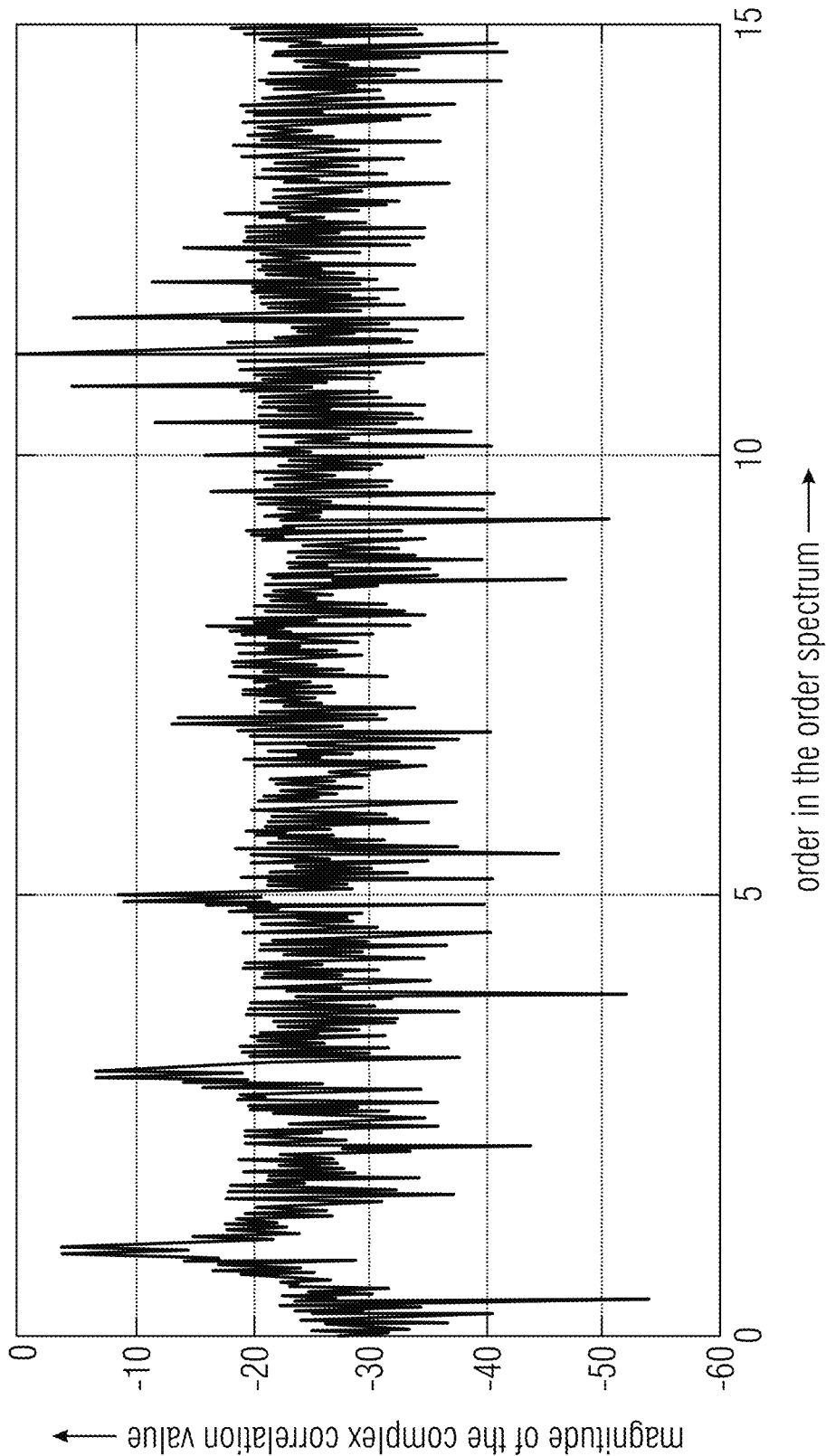
FIG. 5 shows an order spectrum of the signal of FIG. 3.

The following example of FIG. 5 shows the effects of a scaling s=1, present frequency f=10 Hz (and thus a starting frequency ν=10) and the current rotational speed z(t) with a zero time shift τ on the complex order spectrum. The abscissa indicates the order in the order spectrum, the ordinate indicates the magnitude of the complex correlation value between the vibration signal x(t) as the measuring signal and the current analysis function h(t).

FIG. 5 illustrates an order spectrum (magnitude) of the signal y(t, τ, ν) or y(t, τ, s) of FIG. 3 after scaling s=1 and the starting frequency ν=10 Hz (i.e. ν=s*f=10 Hz). The time shift τ is zero. Nearly all the important components can be identified using an energy detector, although the SNR in the time signal is only +9 dB.

Since, in reality, the real rotational speed or phase of rotations is unknown or not measured reliably, the analysis with a variable time shift τ pursuant to formula (1) and formula (4) or formula (5) is helpful.

Figure 6:
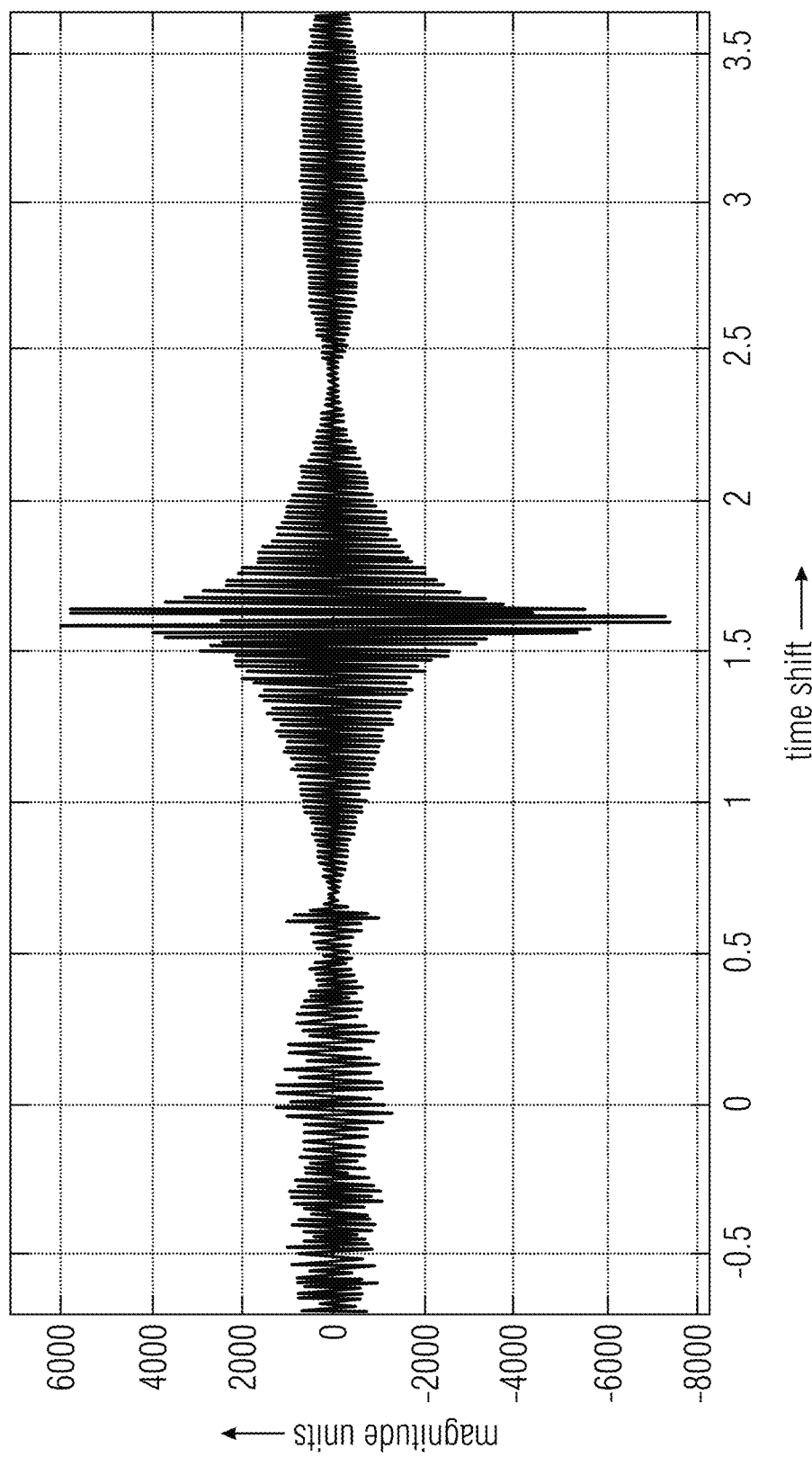
FIG. 6 shows a diagram of the evaluation function from a cross-correlation of a vibration signal with an analysis function.

The result as regards time shift is shown in FIG. 6. Thus, the cross-correlation function (CCF) between the vibration signal x(t) and the analysis function h(t) shifted by two seconds ($16*10^3$ samples) is plotted, i.e. there is a time shift τ=2 s. The diagram shows a clear magnitude maximum with the actual time shift.

If the signal y(t) is evaluated in a discrete-time manner, the result will be the theoretical improvement of SNR from the discrete-time length of the analytical function (1):

$$\Delta SNR = 10 \log_{10} N,$$

N being the number of sample periods of the analytical function.

In this way, an adjustable improvement of the SNR can be achieved along the vibration signal x(t) up to its maximum length in case the rotational speed is known (measured or calculated). The extension by the time shift τ in formula (5) considers the real characteristic of signal detection, namely that the rotational speed is not simulated, but is present only after a certain delay which is needed from the point of view of technology for measuring the rotational speed.

From the complex order spectrum of the signal y(t, τ, ν) pursuant to formula (5) or y(t, τ, s) pursuant to (5a), higher-order order spectra (o>2) can be calculated, from which statistically identifiable phase coupling—and, thus functional connections—can be concluded using an integral transform (like Fourier, Hilbert, Wigner).

From the point of view of practicability, the bi-spectrum and the tri-spectrum (see FIG. 7) are suitable. For calculating the order bi-spectrum, a formula has been used, which is based on formulae (1) and (5):

$$B(o1, o2) = Y(o1) \cdot Y(o2) \cdot Y^*(o1+o2) \quad (6)$$

Thus, Y(o) is the complex order transform pursuant to formula (5) and o is the order. Y(o) is established after searching the maximum, in relation to time shift τ. The sign * marks the conjugate complex function. When phase coupling (and, consequently, functional connections) between the order components is of interest, formula (6) is applied to segments of the vibration signal and averaged arithmetically:

$$\hat{B}(o1, o2) = \frac{1}{M} \sum_{i=1}^{M} B_j(o1, o2) \quad (7)$$

o1, o2 are orders, Bi(o1, o2) is the complex bi-spectrum in the i-th segment.

Figure 7:
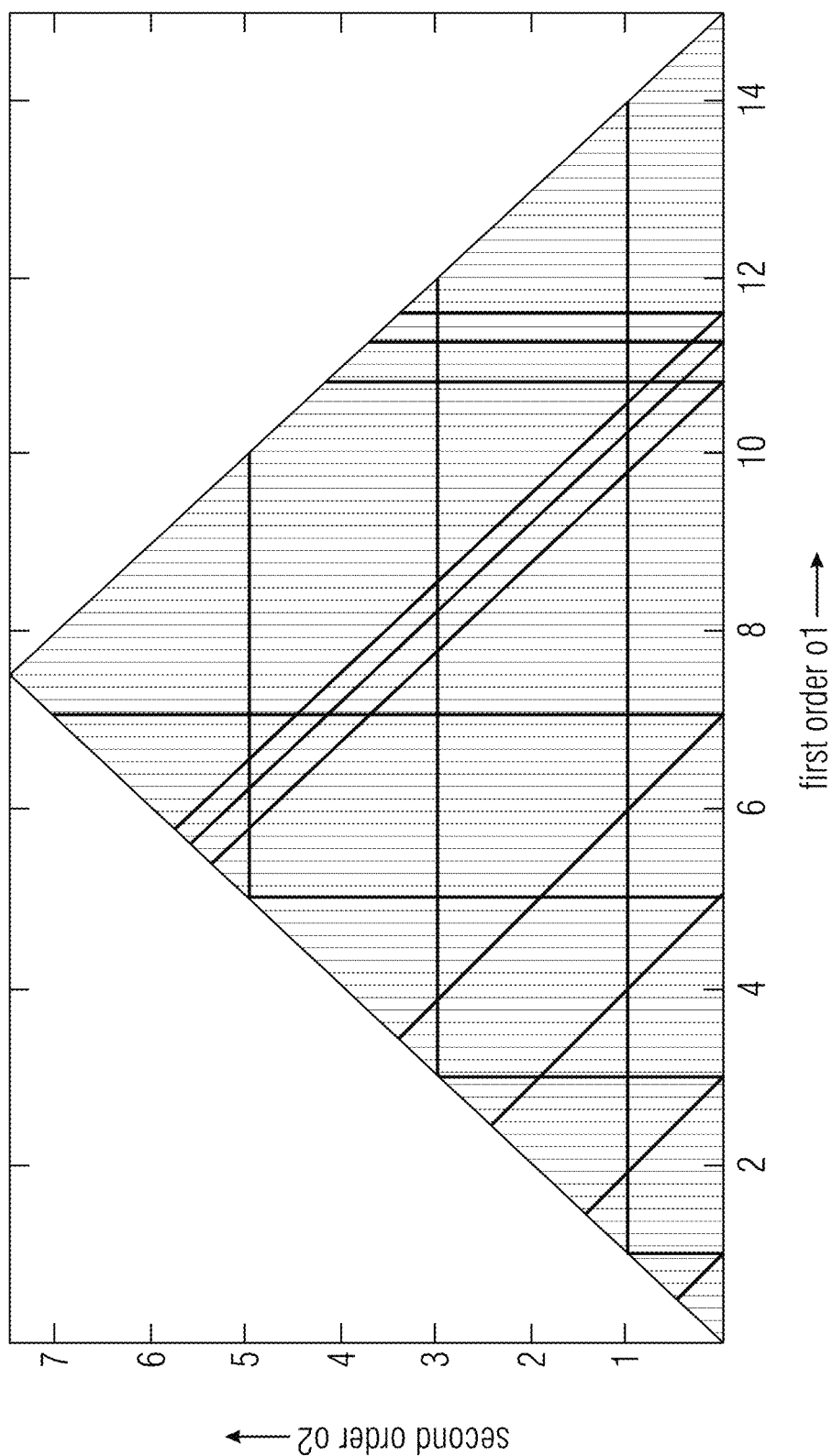
FIG. 7 shows a primary range of an order bi-spectrum of the signal of FIG. 3.

FIG. 7 shows the primary range of the order bi-spectrum of the signal of FIG. 3 after applying the analysis function pursuant to formulae (1) and (5) and (6). Phase-coupled signal components can be detected reliably. The energy islands hint at a statistically high reliability.

The advantages of the invention are described again below:

When compared to existing methods of vibration-based diagnostics by means of envelope detection, the disturbing products caused by the non-linearity of the amplitude demodulator (peak value detector) are avoided by the method claimed. This increases the diagnostic and statistical reliability of the search for defects.

A single sensor for detecting vibrations (solid-borne sound) is sufficient for evaluating the vibration signal. An additional sensor for detecting the rotational speed or a value dependent thereon is an exemplary implementation. Thus, diagnostics systems can be set up which can do without a physical contact to the machine or the rotating part, like using a laser scanner.

Early diagnostics of the rotating element with a weak SNR of smaller than 10 dB and a temporally variable rotational speed is only made possible by the invention. This significant increase in SNR by means of correlation with a temporally variable analysis function is the basis for further analyses. In particular statistics and higher-order spectra or statistics (HOS) allow analyzing functional connections between individual defects. The result of such an analysis may, for example, be answering the question as to whether two (or more) vibrations present in the vibration signal can be attributed to two defects of a single roller bearing or two different roller bearings.

It is assumed that a ball bearing has two defect balls. The vibration signal is detected directly from the surface of the machine using an acceleration sensor or a laser microphone. One of the balls generates a chirp at 300 Hz, the other one at 330 Hz. The SNR of both of them is above 10 dB. Since both rotate in one and the same bearing, both are of an order of, for example, r=8 Hz. Consequently, the diagnostics would detect a clear spectral peak at 8 Hz. This will normally be the case. However, with at least five harmonics (at 16, 24, 32, 40, 48 Hz), the result will be detectable peaks where there are none in reality. This is the consequence of the extreme non-linearity of forming a magnitude in envelope detection.

A more unfavorable case is for two (physically) independent defects to be present: for example, one ball in one bearing produces an order of 8 Hz and an eigenfrequency of 300 Hz, while another ball in another bearing produces an order of 11 Hz and an eigenfrequency of 330 Hz. The envelope demodulator will detect both spectral peaks of the orders, however, also an immense number of incalculable disturbing products which, depending on the situation, may also be of the type of white noise. This means that the SNR may deteriorate dramatically so that an otherwise secure energy detection becomes impossible.

The invention allows recognizing correct defect orders, independently of the eigenfrequency of the individual defects. The following HOS analysis would indicate whether the two disturbances originate from one or two bearings.

Figure 8:
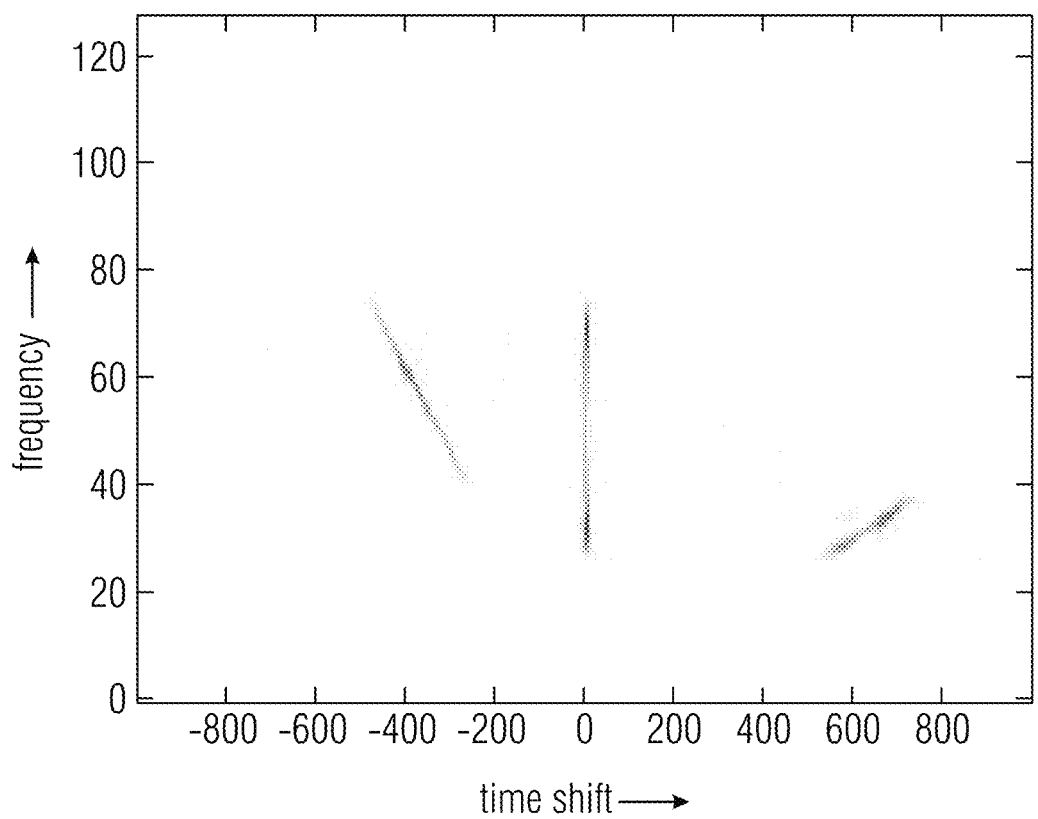
FIG. 8 shows a time-frequency diagram of the analysis function as a cross-correlation function between the noise-infested sum of three linear chirps and an analysis function from C2 (center chirp)

For the noise-infested sum of three linear chirps of FIG. 3, the CCF (cross-correlation function) was calculated, which is illustrated in FIG. 8 as a TFD (time-frequency distribution). C2 (center chirp) was used as the analysis function. Since the chirp searched in the sum of C1, C2 and C3 corresponds exactly to the analysis function, it clearly is present as a detectable bar with a zero time shift in the frequency range of the analysis function. If there were a time shift in the real signal when compared to the analysis function (as is conventional in reality), the result would be a corresponding shift along the time axis in FIG. 8 (as is conventional in CCF). The remainders of chirps C1 and C3 show a clear deviation from the analysis function C2. It is to be kept in mind that, in the TFD shown in FIG. 8, there is hardly noise remaining, meaning that the SNR for detection was improved sufficiently strong.

Figure 9:
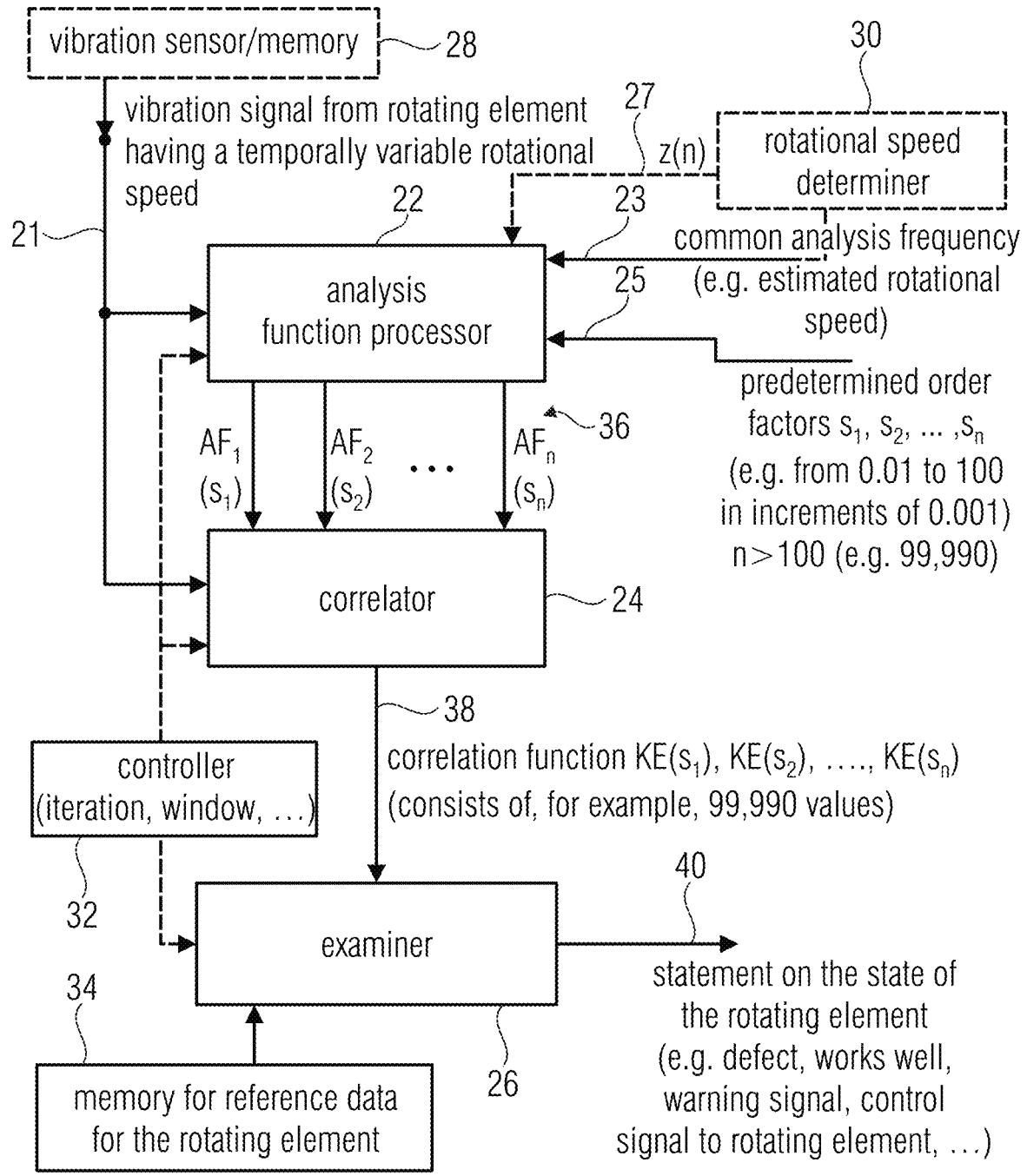
FIG. 9 is a block diagram representation of the apparatus for the analysis of an element rotating at a rotational speed in accordance with embodiments of the present invention.

FIG. 9 shows an embodiment of an apparatus for analyzing an element rotating at a rotational speed based on a vibration signal originating from the rotating element. The apparatus comprises analysis function means 22 for forming a plurality of analysis functions, the analysis function means 22 being configured to calculate each analysis function $Af_1, \ldots Af_n$, illustrated in FIG. 9 by 36, based on an analysis frequency which may be the same for each analysis function, as is illustrated at 23. In addition, the analysis function means is configured to form the analysis functions based on predetermined order factors $s_1, s_2, \ldots, s_n$, wherein the predetermined order factors are different for each analysis function. In addition, the analysis function means is configured to operate based on the vibration signal 21 or based on a measured or estimated or differently determined rotational speed z(t) (continuous in time) or z(n) (discrete in time), which originate from the rotational speed determiner 30, as is illustrated at 27, in order to determine the individual analysis functions.

Additionally, the apparatus comprises correlation means 24 for calculating a correlation function. The correlation function 38 is transferred from the correlation means 24 to examining means 26. The correlation means 24 is configured to calculate a correlation result $KE(s_1), KE(s_2), \ldots, KE(s_n)$ from the vibration signal, illustrated at 21 and provided by signal output means 28, and each analysis function provided by the analysis function means 22. Each correlation result is associated to the order factor which the analysis function is based on, using which the correlation result has been calculated, and the correlation results together here represent the correlation function 38. This correlation function 38 is provided to examining means 26 in order to provide a statement 40 on the state of the rotating element.

The means 28 which the vibration signal originates from may, depending on the implementation of the present invention, be a vibration sensor, like the vibration sensor 2, for example. This represents an "on-line" embodiment which takes a measurement during operation of the rotating element. In an "off-line" variation, the element 28 would be a memory element where the vibration signal is stored, which has, for example, been taken from the rotating element at a previous time. The apparatus for analyzing the rotating element may consequently be employed both in an online embodiment and in an offline embodiment. When the rotating element is a wheel of a rail vehicle or any other movable part of a rail vehicle, street vehicle or different vehicle, for example, the apparatus for analyzing would be implemented on board the vehicle so as to execute an online variation where a statement on the state of the rotating element can be made already during operation and only after a short system-caused delay which is in a range of a few minutes or even less than one minute. In an offline variation, the memory element would be relevant as the element 28. Here, the vibration signal recorded before would be analyzed afterwards, i.e. after the actual measurement.

The examining means 26 is able to find out, as an exemplary statement on the state of the rotating element, whether the element is defect or whether the element works well. Another statement on the state of the rotating element would, for example, be a warning signal, a control signal to the rotating element or to an element driving the rotating element or connected to the rotating element. If, for example, in the case of a rail vehicle, like a subway train, it were determined by the examining means 26 that the correlation function has unexpected characteristics, a statement 40 on the state of the rotating element could be a brake signal for decelerating the rail vehicle, or a warning signal to the driver of the vehicle, containing an indication of not accelerating further or stopping as soon as possible, etc.

Depending on the embodiment, the examining means 26 is connected to a memory 34 for reference data for the rotating element to compare the correlation function 38 provided by the correlation means 24, or information derived from the correlation function, to a corresponding correlation function from the memory 34 as a reference correlation function. When not the correlation functions are compared, but data derived from the correlation functions, the examining means 26 would receive the reference data derived from the reference correlation function from the memory 34 and compare the same to the actually established correlation function data provided by the means 24. Alternatively or additionally, the examining means is configured to make a statement on the state of the rotating element with no comparison to the reference pattern, purely based on the correlation function and, maybe, using empirically found rules.

Figure 16:
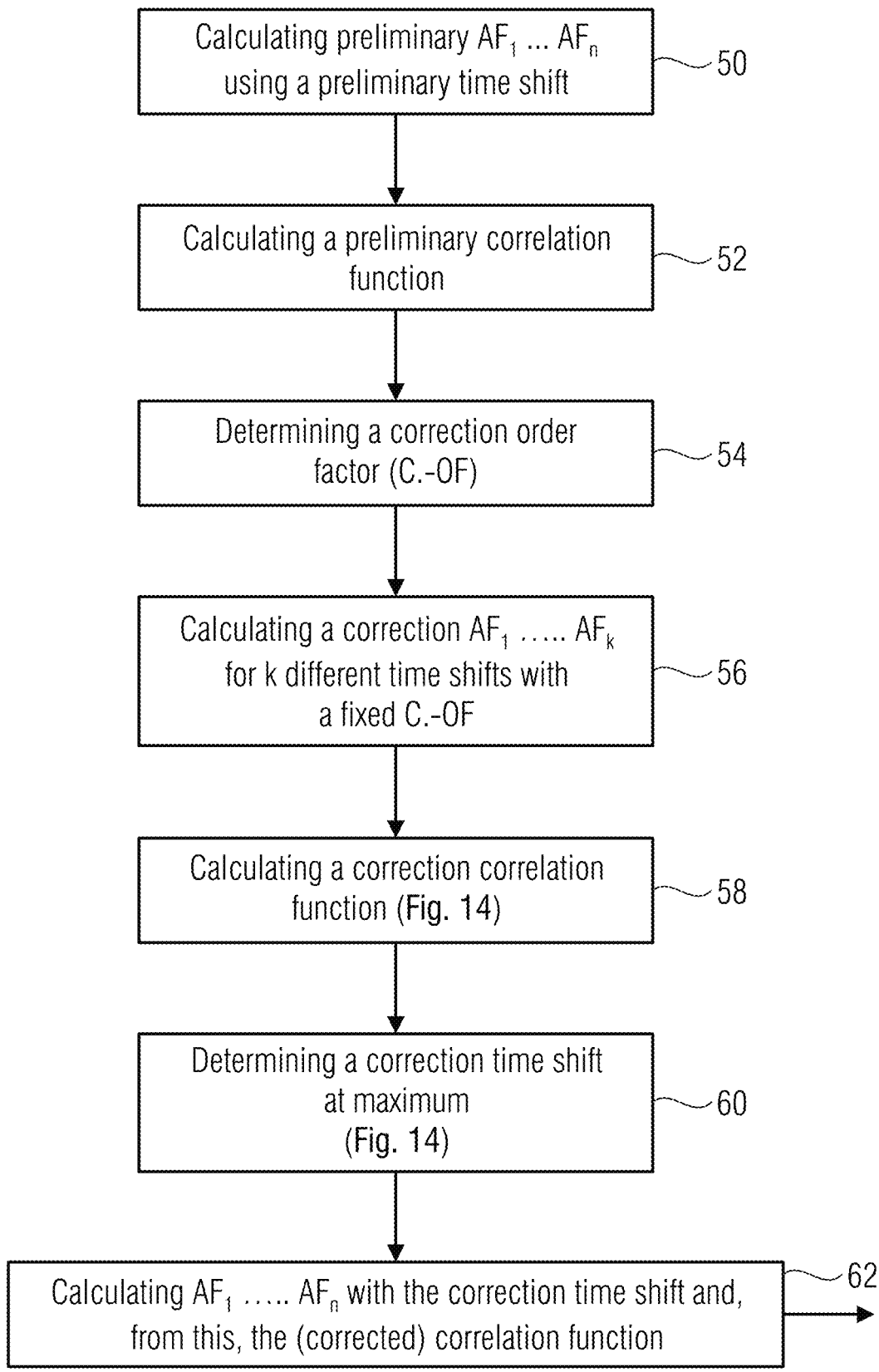
FIG. 16 shows a flowchart for an iterative determination of the correlation function.

Depending on the implementation, the apparatus comprises an additional controller for an iterative improvement of the measuring result, i.e. for iteration processing which is illustrated below referring to FIG. 16. An alternative implementation of the controller or an additional implementation of the controller is to drive a certain analysis window processing used to obtain a discretized processing in the analysis function means, the correlation means and, advantageously, also in the examining means.

In addition, the analysis function means 22 is connected, advantageously via the input 23, to a rotational speed determiner 30 configured to measure or estimate a rotational speed of the rotating element, for example at a beginning or at a different point in time of the analysis window, and to feed the estimated value to an analysis frequency of the analysis function means 33 in order for same to determine the plurality of analysis functions for the different order factors based on the value provided by the rotational speed determiner 30.

Advantageously, the analysis function means 22 is configured to form a high number of different analysis functions. Advantageously, analysis functions having order factors between 0.01 and 100 are formed in increments of 0.001, wherein an even finer incrementation of the order factors may be used or, depending on the implementation and a potential complexity, coarser an incrementation. Depending on whether the rotational speed of the rotating element has been estimated to a more precise degree, coarser an incrementation of the order factors will be possible. In any case, not only integer order factors are used, but typically also real-valued, i.e. non-integer order factors. In addition, depending on the implementation, it is possible to use different regions of order factors, i.e. regions which are smaller than the exemplary region illustrated. In particular in cases where the common analysis frequency is predetermined in a "blind" manner or where there is only a coarse estimation of the rotational speed, a fine incrementation of the order factors will be favorable in order to nevertheless have an analysis function which "fits" a certain harmonic of the (unknown or estimated only coarsely) temporally variable rotational speed of the rotating element in a relatively precise manner.

The analysis functions h(t, τ, s) and y(t, τ, v) can be determined pursuant to equation (1). Alternatively, the analysis functions are determined pursuant to the following equation (8).

$$h(t,\tau,v)=\exp(j2\pi sft+jsr(t+\tau)) \qquad (8)$$

Thus, the following terms are used:
j being the imaginary unit
r(t) being the temporally variable phase after the revolutions taken place up to the time t, during the analysis time; consequently, this is the time integral relative to the rotational speed z(t), wherein z(t)=dr(t)/dt.
f being the starting value of the analysis frequency (or a differently defined frequency value, like an estimated value for the rotating frequency, for example).
s being a real-valued scaling factor in the frequency range.
τ being the independent variable of time shift.

FIG. 10 shows a summary of an advantageous analysis function or group of analysis functions represented also in equation 8. This group of analysis functions comprises the first term 41 which, apart from the corresponding order factor s, also comprises the common analysis frequency f. t is the time variable. Additionally, the group of analysis functions comprises a second phase term where the order factor is present again and where additionally there is a temporally variable phase which is additionally provided with a time shift, wherein the time shift, however, may also be zero so that, in one embodiment, the variable τ in equation (8) is not present such that the group of analysis functions depends only on the order number s and the time variable t or, as is illustrated in the bottom half in FIG. 10, on the discrete time variable n.

Both in the embodiment illustrated referring to equation 8 and in the embodiment illustrated referring to equation 1, the individual analysis functions are determined in that the same data can be used for f and r for each analysis function, but a different order factor is chosen. This means that a special analysis function is obtained for each order factor.

Figure 11:
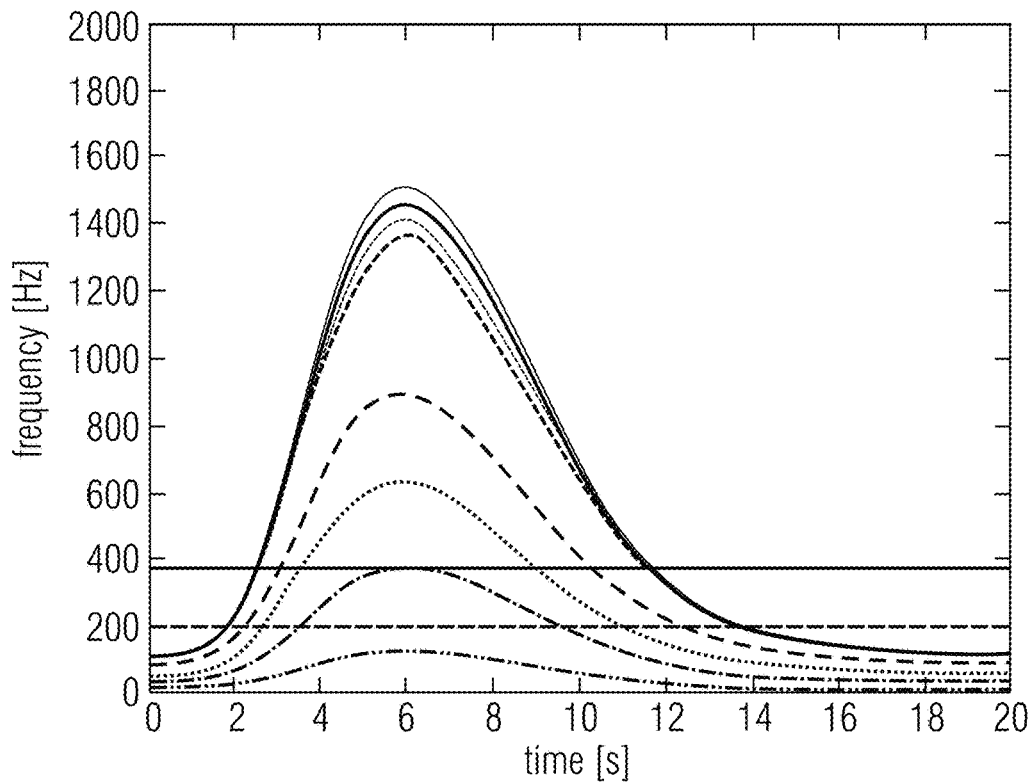
FIG. 11 shows a spectrogram for a vibration signal.

Subsequently, a realization example which represents the online variation will be illustrated. The offline variation results by simply switching to static data from the online variation illustrated. As an example signal, reference is made to the measuring signal illustrated in FIG. 3 and FIG. 4 and, subsequently, also in FIG. 11, wherein it is pointed out that FIG. 11 does not represent the actual vibration signal, but a spectrogram of the vibrations obtained by an SPWD, i.e. Smoothed Pseudo Wigner Distribution. Actually, not the spectrogram illustration of FIG. 11 is used as the vibration signal 21 in FIG. 9, but a vibration signal on which the spectrogram representation is based.

For the subsequent embodiment, it is exemplarily only assumed that processing in an analysis window starts at a time t=3 s, for example. In particular, when compared to the spectrogram illustrated in FIG. 11, an improvement in the signal-to-noise distance by roughly 40 dB relative to the noise is aimed at. The result, with a sample rate of, for example, 8000 sps (samples per second), is a minimum length for an analysis window of roughly 1 second. This means that an analysis can be started with at the earliest at a time t=4 s, since measuring value recording for the analysis window has started at t=3 s. Advantageously, computing takes place in real time, advantageously clocked by the sample rate of 125 µs. However, due to the length of the (trailing) analysis window of 1 second, there is a corresponding latency of at least 1 second. Nevertheless, this analysis is considered to be an online method exhibiting a very small system-caused latency.

In the time window for analysis, there are measuring data present in the vibration signal between the start time of the analysis window at 3 seconds and the end time of the analysis window at t=4 s.

In addition, advantageously, there are measuring data for the rotating frequency. These measuring data may, but do not have to be present, and may be estimated from, for example, the spectrogram illustrated in FIG. 11, for example for the fundamental wave at t=3 s. For this typically sufficiently coarse estimation performed by the rotational speed determiner 30 in FIG. 9, no spectrogram exhibiting a very high signal-to-noise ratio must be present. Due to the smaller quantization of the order factors which may also comprise non-integer values, the probability of "hitting" the estimated rotational speed in the correlation function at an order number multiplied by the analysis frequency is high despite an initial analysis frequency which has not been estimated precisely, for example at the beginning of the analysis window.

Figure 12:
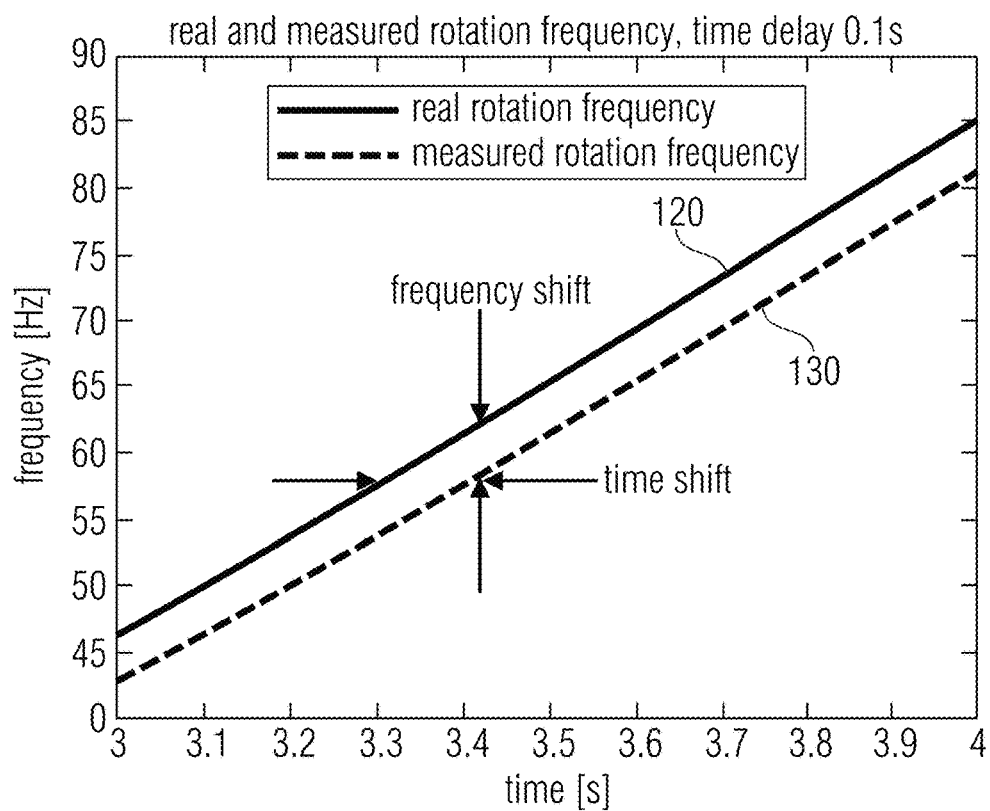
FIG. 12 shows an illustration of the time shift and frequency shift between a real and a measured rotation frequency.

When, however, the rotational speed determiner 30 provides an online or offline measurement of the rotating frequency, it can be assumed that the measuring value of the rotating frequency will lag behind and, theoretically, also lead the true rotational speed by a certain time. This delay τ will principally be at least one sample period, exemplarily given by the distance between two teeth in a gear. In addition, this sample period or duration τ principally is also variable over time. Consequently, advantageously, the time offset is to be considered during analysis. A time shift is considered here, as is illustrated in FIG. 12 and can also be gathered from equation 5. In addition, due to this difference in time, the result will also be an unknown frequency shift. Consequently, FIG. 12 shows the signal flow with an exemplarily assumed real rotational speed between the times t=3 s and t=4 s at 120 and the signal flow of the measured rotating frequency also between a time of 3 seconds and a time of 4 seconds at 130.

Subsequently, an embodiment for forming the analysis function will be explained. The three parameters corresponding to equation 5 are used for forming the analysis functions. These are time t between the times t=3 s and t=4 s, which may be replaced by a discretized time having an index n which, when there are 8000 sample values in an analysis window, ranges from 1 to 8000.

Additionally, the time shift τ, if known, is set to the corresponding value. Typically, however, neither the time shift of the rotating frequency measured nor that of the vibration signal relative to the real rotating frequency is known. Consequently, a corresponding correction flow may be initiated by the controller 32, as will be discussed in greater detail in FIG. 16, for example. Advantageously, with a fixed order factor, a number of analysis functions is to be determined where, in contrast to the order factors as have been described referring to FIG. 9, not the order factors, but the delay time τ is variable in a certain manner, advantageously in a discretized dimension which is, for example, from −1 s to 1 s in steps of 5 ms. The results are 200 different analysis functions having different discretized delay times.

The scale frequency ν which is formed as the product of the analysis frequency or starting frequency in the analysis window f and the discretized scaling factor or order factor, is also used for forming the analysis functions pursuant to FIG. 10 or equation 8 or equation 1. Generally, one does not know at which real-valued, i.e. integer or fractioned scalings of the rotating frequency vibrations may occur, as is illustrated in FIG. 11. The spectrum shown there which exemplarily represents accelerating and subsequent decelerating of a rail vehicle, like of a subway train, for example, results in diverse harmonics which can be recognized in FIG. 11 as lines.

However, one does not know before which lines will occur. In addition, the analysis having a high signal-to-noise ratio is of high importance in particular here, since it may be important for a precise analysis to determine which harmonics exist and, in addition, which harmonics exist at which intensity. In particular, a comparison, represented by the examining means 26 of FIG. 9, between a measured correlation function and a stored correlation function may result in a situation where a significant harmonic is discovered at once in the correlation function measured at a scaling factor or order factor, which was not present in a previous reference measurement or which hints at a developing defect of the rotating element or part connected to the rotating element.

Advantageously, the scaling factor or order factor s or the order factor s starts at a suitable low value, for example s=0.01, and increases, with a sufficient resolution, like 0.001, to an upper threshold of the scaling factors or order factors, which may, advantageously, be in a range of 100. The first value measured of the rotating frequency in the analysis window may be used as the starting frequency f, which in this specific example is f=42.7 Hz, as is also assumed in FIG. 15a, where a maximum in the cross correlation function CCF has been measured at an order factor of 1.

The phase r(t) used for constructing the analysis functions pursuant to equation 1 or 8 may be calculated theoretically pursuant to formula 1.1 or using simulations, in dependence on the vibration signal. However, it is of advantage, in particular for the online embodiment, to set a starting value for the starting point in an analysis window. It would be advantageous here, for reasons of simplicity, to set the starting point r(t)=0, although different phase values could also be used since, principally, it cannot be easily predicted which absolute phase there is at the beginning of the analysis window. In this case, r(t) actually represents the phase difference between the beginning and the end of the analysis window. Since the analysis window also represents a temporal difference in the vibration signal (end time minus start time), the phase difference can be interpreted to be the absolute phase in the time interval considered. Thus, the phase for the sampled discrete-time signal r(n) is calculated based on the following equation:

$$r(n)=2\pi\Sigma_1^n z(n)/f_s,$$

$f_s$ being the fundamental frequency of the sample rate and, in the example considered at present, set to 8000 Hz. z(n) here represents the estimated or measured rotational speed or rotational speed obtained in a different manner, at the time n.

An alternative type of determining the phase r is performed based on the following equation:

$$r(n)=2\pi\Sigma_1^n n(f \pm z(n))/f_s,$$

z(n) being a value for the rotational speed at a time n, a time n equaling 1 being the starting point of the analysis window, and $f_s$ being a sample rate which the discrete vibration signal is based on, and f equaling the rotational speed at the beginning of the analysis window.

Another alternative for determining the phase r is performed based on the following equation:

$$r(n+\tau)=2\pi\Sigma_1^n n(f \pm z(n+\tau))/f_s,$$

z(n) being a value for the rotational speed at a time n, a time n equaling 1 being the starting point of the analysis window, $f_s$ being a sample rate which the discrete vibration signal is based on, and τ being a time shift parameter and f being the rotational speed at the beginning of the analysis window.

Further alternatives which are based directly or indirectly on the vibration signal can also be used for determining the phase term. Thus, the vibration signal itself instead of z(n) can be used in the first one of the above three equations or in all three equations, or a rotational speed derived from the vibration signal or an otherwise measured or estimated rotational speed z(t) or z(n).

After realizing the above illustrated measures, a three-dimensional analysis function in correspondence with equation 8 and equation 1 is available. It is then used for analyzing the vibration signal x(t) or x(n) in correspondence with equations 2 to 5 so that the result available is the three-dimensional decomposition y(t, τ, s) of the vibration signal x(t) for further interpretation. The decomposition y(t, τ, s) may theoretically be integrated for any of the three variables, so that, depending on what is aimed at, the result is a one- to three-dimensional cross-correlation function. This means that a specific complete cross correlation function is calculated for each analysis window, which comprises a plurality of correlation results for each of the plurality of analysis functions.

From the theoretically seven potential integrations along one, two or three variables of the decomposition (t, τ, s), the practical combination of integrating along the time t with the parameters τ and ν or s results as an advantageous practical analysis. Due to the actually suitable 3D representation in the case of two parameters, which, however, may become confusing, subsequently the parameters are used in a separate manner for 2D projections.

Figure 13:
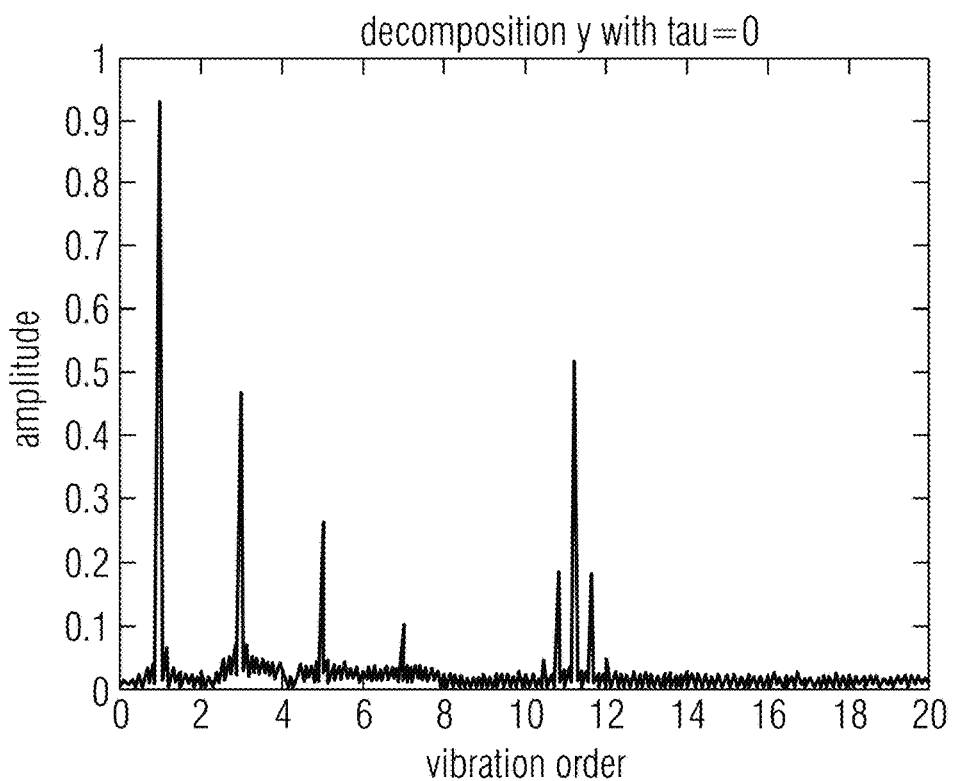
FIG. 13 shows an order spectrum of the vibration signal for an analysis window.
Figure 15A:
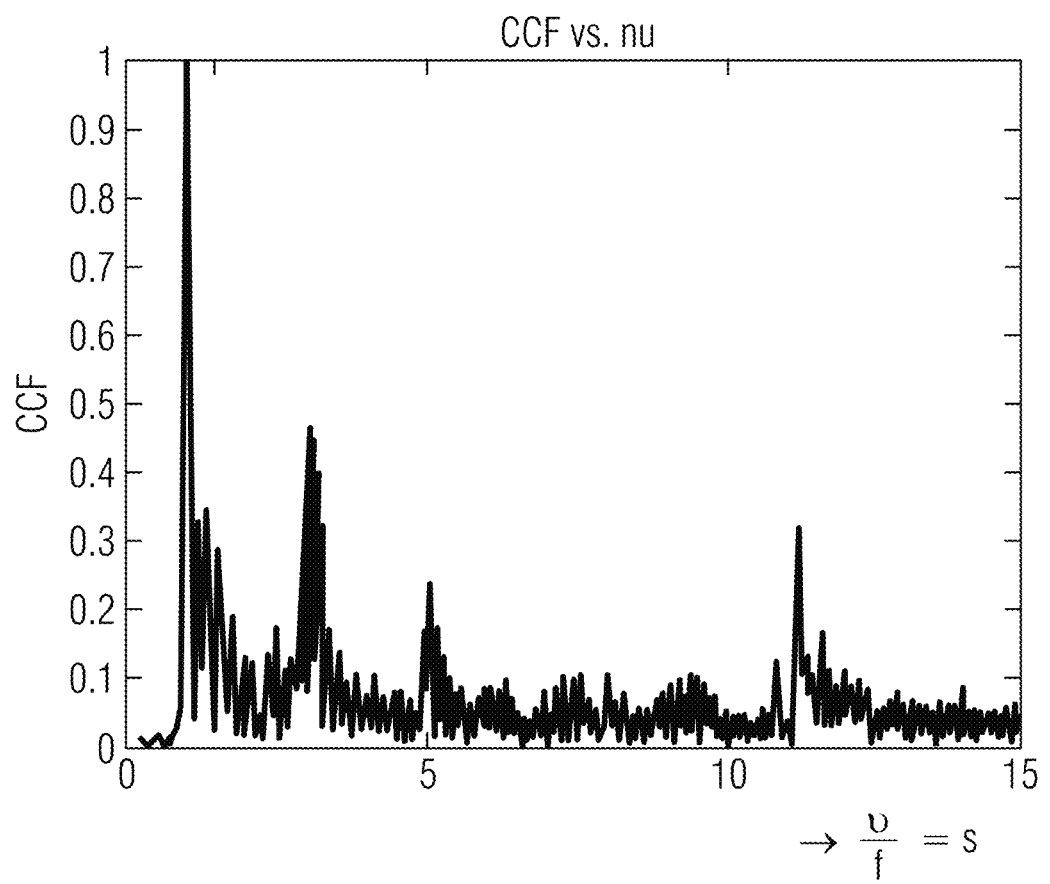
FIG. 15a shows a correlation function having a fixed time shift and a variable analysis frequency.

FIG. 13 shows the projection to the scaling factor or order factor s or the frequency ν with a constant time shift, which exemplarily, has been chosen to be τ=0. In this example, the scaling s is identical to the vibration order so that FIG. 13 shows the order spectrum for the time interval t=3 s to t=4 s. Thus, FIG. 13 already shows a cross-correlation function which can be fed to the examining means 26 of FIG. 9 in order to provide a statement on the state of the rotating element based on the cross-correlation function.

Where there is such an order illustration, this is particularly due to the fact that the rotational speed has already been "hit" as the analysis frequency relatively precisely. When, however, the rotational speed is not "hit" as the analysis frequency precisely, recalculating the order factors is used in order to arrive, when starting from the order factors with a non-precisely-hit rotational speed, at an order diagram where an order factor of 1 corresponds to the fundamental wave of the rotational speed. Since the time shift of the measured rotation frequency compared to the real one and compared to the vibration signal is unknown, the dependence of the amplitude of the decomposition y(t, τ, s) on a time shift τ can be established. In FIG. 15a, this dependence is illustrated for the order of s=11.2. FIG. 15a shows the dependence of the decomposition y(t, τ, s) on the unknown time shift, τ, wherein the time shift for the highest order of the vibration signal of s=11.2 relative to the example in FIG. 13 was established. It is to be pointed out that the dependence is very narrow. The maximum here is distributed only across a few milliseconds.

FIG. 15a additionally shows a further illustration of the dependence of the decomposition y(t, τ, s) on the starting frequency ν=s·f, wherein, in other words, the abscissa in FIG. 15a shows the order number, like in FIG. 13, and wherein the connection between the order number s is given by ν/f. It becomes obvious from FIG. 15a that all the orders up to the order 7 are illustrated correctly. Thus, it is of advantage for this implementation of the present invention to determine a suitable combination of τ and ν. An iterative procedure can be used here, which is instructed by the controller 32. In one embodiment, the iterative procedure is as is shown in FIG. 16. In step 50, calculating the preliminary analysis functions by the analysis function means is done, using a preliminary (estimated) time shift τ0 which may, for example, be zero, as has already been illustrated in FIG. 13.

Figure 15B:
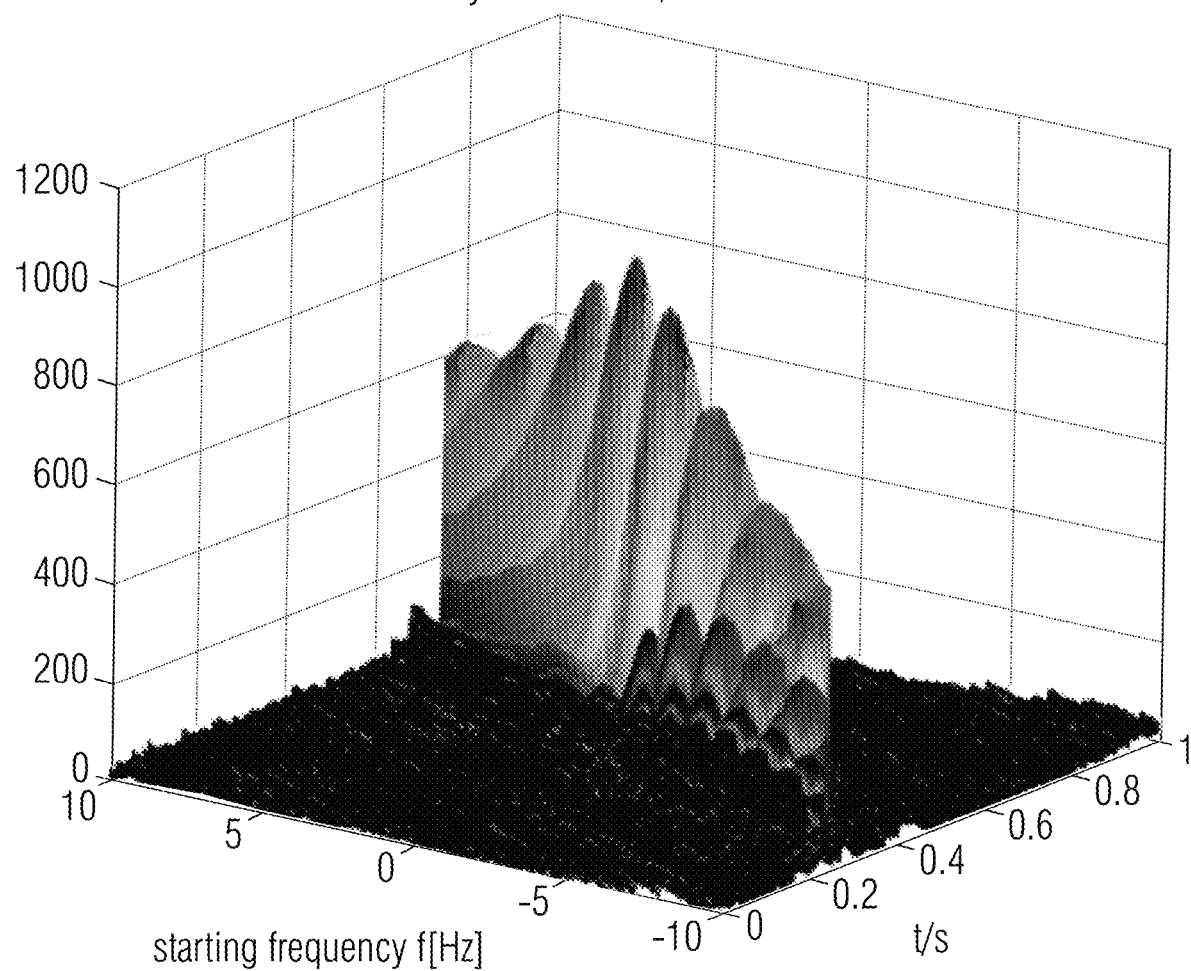
FIG. 15b shows a two-dimensional illustration of the correlation function having a fixed time shift and a variable analysis frequency.

FIG. 15b shows a two-dimensional correlation function having a fixed time shift, fixed order and variable analysis frequency per correlation result. In particular, the dependence of the decomposition on the starting frequency of the signal in accordance with FIG. 3 or FIG. 11 is illustrated. The decomposition was calculated for the order s=11.2. However, it is of advantage to determine a suitable combination of τ0 and s, for example by the procedure of FIG. 16, or, alternatively, empirically.

In a subsequent step 52, a preliminary correlation function is calculated, as is exemplarily illustrated in FIG. 13. This calculated preliminary correlation function is performed by the correlation means 24. Subsequently, in step 24, a correction order factor (C.-OF) is calculated, also advantageously by the correlation means or by the controller, which, for example, is the order factor 11.2. Advantageously, this order factor is determined to be a global maximum (except for the order factor 1) or a local maximum. As is illustrated in step 56, calculating correction analysis functions $Af_1, \ldots Af_k$ is then performed for k different time shifts, whereas, however, in contrast to the illustration shown in FIG. 9, the order factor here is determined to be the correction order factor for all the analysis functions.

Figure 14:
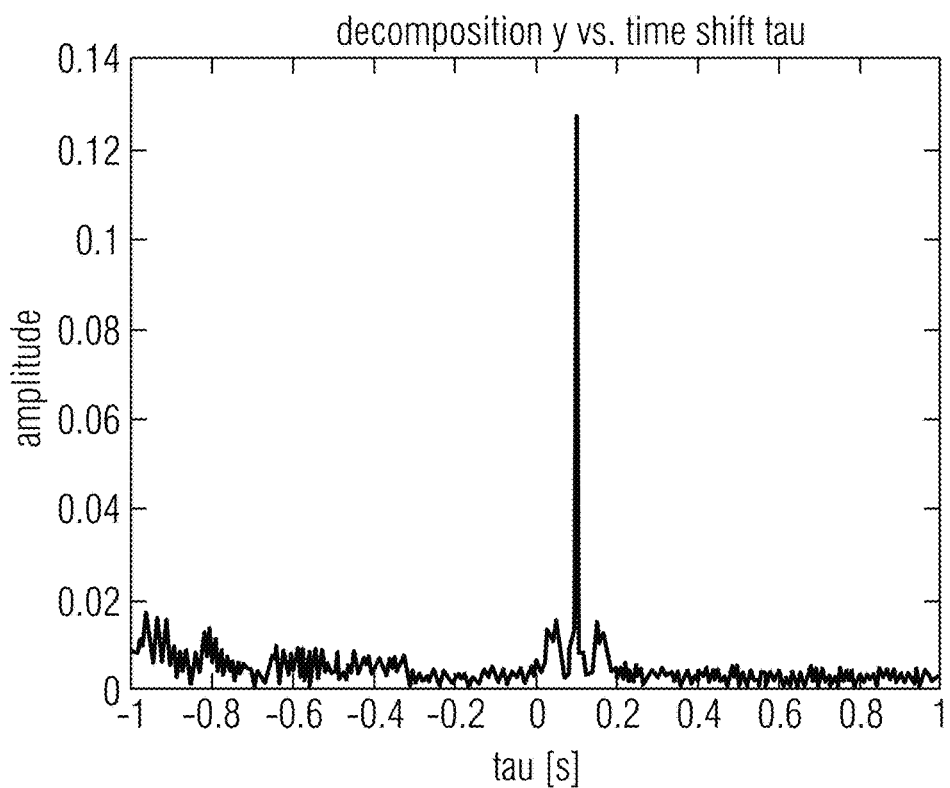
FIG. 14 shows a correlation function having a fixed order factor and a variable time shift.

Then, in step 58, a correction correlation function is calculated again by the correlation means 24, which is illustrated in FIG. 14 and which exhibits an extraordinarily clear peak at τ=0.1 s. The time value τ=0.1 s is determined by the correlation means 24 in step 60 by determining the maximum of the correlation function in FIG. 14.

Subsequently, in a second or corrected process, calculating the analysis functions $Af_1$-$Af_n$ by the analysis function means is performed, however with the correction time shift having been determined in step 60. The result is a more precise correlation function which will have more narrow and, maybe, higher peaks than in FIG. 13 and thus provides for improved information for the examining means 26 for evaluating the state of the rotating element or making a statement on this state.

The group of analysis functions illustrated by equation 1 or equation 8, the individual analysis functions being obtained by the individual order factors set, is three-dimensional since it is dependent on the independent variables of time, time shift and frequency or order number. Advantageously, for one embodiment of the apparatus for analyzing an element rotating at a rotational speed, a two-dimensional space of variables is used, namely using the frequency shift or scaling factor or order factor, and the time shift. Since we talk about second-order statistics here, a global maximum will represent an optimum combination of time and frequency shift and finding this maximum may, for example, be performed on the basis of the embodiment shown in FIG. 16.

In an embodiment where a discrete process in analysis windows is used, both the analysis function means and the correlation means are configured to process one analysis window after the other, wherein a feed from one analysis window to the next can be set in dependence on the implementation in that the analysis windows overlap partly or do not overlap.

In addition, as has been illustrated referring to equation 3, it is of advantage for the correlation means to calculate a correlation result CR for each analysis window and for each individual analysis function, the results together being referred to by ρ. A correlation result is obtained by calculating a scalar product from the vibration signal VS and the analysis function, for an analysis window. This is illustrated in FIG. 17a. Since the analysis function is a complex signal comprising both a real part and an imaginary part, as is illustrated in FIG. 7c, the correlation result will comprise at first a real part $\rho_{RE}$ and an imaginary part $\rho_{IM}$. The actual correlation result for the first analysis function $Af_1$ is then obtained as a magnitude of the complex correlation result, as is illustrated in FIG. 17b, i.e. by each squaring and adding the real part and the imaginary part of the complex scalar product, and subsequently calculating the root.

Different calculations which are based on a real-valued representation of the analysis function may also be performed. In addition, different calculations than that in FIG. 17a to 17c can be performed, which are based on a complex analysis function, but determine the final correlation result, which is a real value, in an alternative manner.

Further embodiments of the present invention will be discussed below:

1. An apparatus (1) for monitoring a rotating element (10), comprising a vibration sensor (2) and an evaluation device (4), wherein the vibration sensor (2) is implemented to generate a time-dependent signal x(t) starting from vibrations of the rotating element (10), wherein the evaluation device (4) is implemented to establish a statement on a state of the rotating element (10) using the vibration signal (x(t)) and using a time-dependent rotational speed (z(t)) of the rotating element (10) and/or using a value (r(t)) depending on a time-dependent rotational speed (z(t)) of the rotating element (10), where in the evaluation device (4) is implemented to correlate the vibration signal (x(t)) with a harmonic analysis function (h(t)) dependent on a predeterminable starting frequency (ν) and the rotational speed (z(t)) and/or a value depending on the rotational speed (z(t)) while inserting a predeterminable time shift (τ) between the vibration signal (x(t)) and the analysis function (h(t)) and to establish the statement on the state of the rotating element (10) starting from an evaluation function (y(t, τ, ν)) obtained by cross-correlation, and wherein the evaluation device (4) is implemented to vary values of the starting frequency (ν) and/or the time shift (τ) when establishing the statement on the state of the rotating element (10).

2. The apparatus (1) in accordance with example 1, wherein the apparatus (1) additionally comprises a rotation sensor (3), and wherein the rotation sensor (3) is implemented to measure the rotational speed (z(t)) and/or the value (r(t)) dependent on the rotational speed (z(t)).

3. The apparatus (1) in accordance with example 1 or 2, wherein the evaluation device (4) is implemented to establish the rotational speed z(t) and/or the value r(t) dependent on the rotational speed z(t) using a time-frequency distribution of the vibration signal x(t).

4. The apparatus (1) in accordance with any of examples 1 to 3, wherein the evaluation device (4) is implemented to establish a deviation from a set state of the rotating element (10) as a statement on the state of the rotating element (10).

5. The apparatus (1) in accordance with any of examples 1 to 4, wherein the evaluation device (4) is implemented to obtain the evaluation function (y(t, τ, ν)) by convoluting the vibration signal (x(t)) with the temporally mirrored analysis function (h(t)).

6. The apparatus (1) in accordance with any of examples 1 to 5,
wherein the evaluation device (4) is implemented to use an analysis function (h(t)) which is dependent at least on a time-dependent phase r(t) of the rotations as an integral value of the rotational speed (z(t)) and on the starting frequency (ν).

7. The apparatus (1) in accordance with any of examples 1 to 6,
wherein the evaluation device (4) is implemented to use an analysis function (h(t)) which is dependent at least on an exponential function having an argument dependent on a product of a time-dependent phase (r(t)) of the rotations as an integral value of the rotational speed (z(t)) and the starting frequency (ν).

8. The apparatus (1) in accordance with any of examples 1 to 7,
wherein the evaluation device (4) is implemented to use an analysis function (h(t)) dependent at least on the following exponential function: exp(j f s r(t)),
j being the imaginary unit,
f being a predeterminable frequency value,
s being a predeterminable scaling factor,
r(t) being a time-dependent phase of the rotations as an integral value of the rotational speed (z(t)), and
the predeterminable starting frequency (ν) equaling a product of the predeterminable frequency value (f) and the predeterminable scaling factor (s).

9. The apparatus (1) in accordance with any of examples 1 to 8,
wherein the evaluation device (4) is implemented to establish a maximum correlation and/or a maximum signal energy of the evaluation function (y(t, τ, ν)).

10. The apparatus (1) in accordance with example 9,
wherein the evaluation device (4) is implemented to establish the maximum correlation and/or the maximum signal energy of the evaluation function (y(t, τ, ν)) for several combinations of varied values of the starting frequency (ν) and/or time shift (τ).

11. The apparatus (1) in accordance with any of examples 1 to 10,
wherein the evaluation device (4) is implemented to generate an order spectrum from an evaluation of the evaluation function (y(t, τ, ν)) and/or identify an order of defects of the rotating element (10).

12. The apparatus (1) in accordance with any of examples 1 to 11,
wherein the evaluation device (4) is implemented to establish spectra starting form a third order when evaluating the evaluation function (y(t, τ, ν)).

13. A method for monitoring a rotating element (10),
wherein a time-dependent vibration signal (x(t)) is generated starting from vibrations of the rotating element (10),
wherein a statement on a state of the rotating element (10) is established using the vibration signal (x(t)) and using a time-dependent rotational speed (z(t)) of the rotating element (10) and/or using a value (r(t)) dependent on a time-dependent rotational speed (z(t)) of the rotating element (10) by correlating the vibration signal (x(t)) with a harmonic analysis function (h(t)) dependent on a predeterminable starting frequency (ν) and on a rotational speed (z(t)) and/or a value dependent on the rotational speed (z(t)) while inserting a predeterminable time shift (τ) between the vibration signal (x(t)) and the analysis function (h(t)) and establishing the statement on the state of the rotating element (10) starting from an evaluation function (y(t, τ, ν)) obtained by cross correlation, and
by varying values of the starting frequency ν and/or the time shift (τ).

Although some aspects have been described in the context of an apparatus, it is clear that these aspects also represent a description of the corresponding method, such that a block or element of an apparatus also corresponds to a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software or at least partly in hardware or at least party in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention may be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing at least one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods may be performed by any hardware apparatus. This may be universally applicable hardware, such as a computer processor (CPU), or hardware specific for the method, such as ASIC or a microprocessor, like in the form of an ARM architecture.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for analyzing an element rotating at a rotational speed based on a vibration signal originating from the rotating element, comprising:
    an analysis function processor configured for forming a plurality of analysis functions, the analysis function processor being configured to form each analysis function based on an analysis frequency, based on the vibration signal or based on a measured or estimated rotational speed and based on a predetermined order factor, the predetermined order factor differing for each analysis function;
    a correlator configured for calculating a correlation function, the correlator being configured to calculate a correlation result from the vibration signal and each analysis function, each correlation result being associated to the order factor which the analysis function, with which the correlation result was calculated, is based on, and the correlation results representing the correlation function; and
    an examiner configured for examining the correlation function or for examining information derived from the correlation function so as to make a statement on a state of the rotating element,
    wherein at least one of the analysis function processor, the correlator and the examiner comprises, at least in part, a hardware implementation,
    wherein the analysis function processor is configured to calculate the different analysis functions based on the following equation:

$$h(t,\tau,s) = \exp(j2\pi s f t + j s r(t+\tau)),$$

$h(t,\tau,s)$ being the analysis functions, t being a time variable, $\tau$ being a time shift, s representing the predetermined order factor for each analysis function, f being an analysis frequency, and $r(t+\tau)$ being a phase term dependent on the vibration signal or the rotational speed, or
    wherein the correlator is configured to: calculate a preliminary correlation function using a preliminary time shift between the vibration signal and the plurality of analysis functions, to establish a correction order factor of a local or global maximum of the preliminary correlation function, wherein the analysis function processor is configured to calculate a plurality of correction analysis functions which are based on the same correction order factor and which comprise a different time shift, wherein the correlator is configured to calculate a correction correlation function from the vibration signal and the plurality of correction analysis functions, and to evaluate the correction correlation function in order to establish a maximum associated to a correction time shift, wherein the analysis function processor is configured to calculate correction analysis functions using the correction time shift, and wherein the correlator is configured to calculate the correlation function based on the correction analysis functions which are based on the correction time shift, and
    wherein the examiner is configured, in making the statement, for
        finding out, whether the rotating element is defect or whether the rotating element works well, or
        generating a warning signal, or
        generating a control signal to the rotating element or to an element driving the rotating element or connected to the rotating element, or
        generating a brake signal for decelerating a vehicle comprising the rotating element, or
        generating a warning signal to a driver of a vehicle, containing an indication of not accelerating further or stopping as soon as possible.

2. The apparatus in accordance with claim 1,
    wherein the analysis function processor is configured to form the analysis functions for an analysis window comprising a start time and an end time,
    wherein the analysis function processor is configured to form the plurality of analysis functions based on the vibration signal between the start time and the end time, and
    wherein the correlator is configured to calculate each correlation result for the analysis window so as to acquire the correlation function for the analysis window.

3. The apparatus in accordance with claim 2, wherein the analysis function processor is configured to generate the plurality of analysis functions with discrete values to obtain discrete analysis functions,
    wherein the correlator is configured to calculate the correlation results using a signal vector of the vibration signal comprising a discrete vibration signal in the analysis window, and using the discrete analysis functions.

4. The apparatus in accordance with claim 1,
    wherein the analysis function processor is configured to use an estimated value for the rotational speed as the analysis frequency or to use an analysis frequency equal for all the analysis functions, or wherein the analysis function processor is configured to use non-integer order factors or non-integer order factors and integer order factors as the order factor, or wherein the analysis function processor is configured to use an order factor comprising a minimum value of smaller than 1, or to use an order factor comprising a maximum value of greater than 10, order factors differing by an increment of smaller than 0.5 being located between the smallest value of the order factor and the greatest value of the order factor.

5. The apparatus in accordance with claim 3, wherein the analysis function processor is configured to calculate the time-dependent phase term for each analysis function by calculating a phase at a time based on the following equation:

$$r(n)=2\pi\Sigma_1^n (f \pm z(n))/f_s,$$

z(n) being a value for the rotational speed at a time n, a time n equaling 1 being the starting point of the analysis window, and $f_s$ being a sample rate which the discrete vibration signal is based on, and f being the rotational speed at the beginning of the analysis window, or wherein the analysis function processor is configured to calculate the time-dependent phase term for each analysis function by calculating a phase at a time based on the following equation:

$$r(n+\tau)=2\pi\Sigma_1^n (f \pm z(n+\tau))/f_s,$$

z(n) being a value for the rotational speed at a time n, a time n equaling 1 being the starting point of an analysis window, $f_s$ being a sample rate which the discrete vibration signal is based on, and τ being the time shift and f being the rotational speed at the beginning of the analysis window.

6. The apparatus in accordance with claim 5, wherein the analysis function processor is configured to calculate the time-dependent phase term for each analysis function based on a product of r(n) or r(n+τ) and the order factor.

7. The apparatus in accordance with claim 5, wherein the analysis function processor is configured to additionally use a further phase term which depends on the order factor and is not dependent on the vibration signal in the analysis window.

8. The apparatus in accordance with claim 1, wherein the examiner is configured to compare the correlation function or a representation derived from the correlation function to a reference correlation function or a reference representation derived from the reference correlation function in order to make the statement on the state of the rotating element with a deviation above an absolute or relative threshold, wherein the reference correlation function or the reference representation originates from the rotating element at an earlier time, or from a reference element for the rotating element.

9. The apparatus in accordance with claim 1, wherein the analysis function processor and the correlator are configured to calculate a first correlation function for a first analysis window and to calculate a second correlation function for a second analysis window, the second analysis window following in time after the first analysis window and partly overlapping or not overlapping the first analysis window.

10. The apparatus in accordance with claim 9, wherein the analysis function processor is configured to use an estimated rotational speed at the beginning of the analysis window as an analysis frequency for the first analysis window and to calculate the plurality of analysis functions for the first analysis window using the vibration signal in the first analysis window, wherein the analysis function processor is configured to use an estimated rotational speed at the beginning of the second analysis window as an analysis frequency for the second analysis window and to calculate the plurality of analysis functions for the second analysis window with the vibration signal in the second analysis window.

11. The apparatus in accordance with claim 1, wherein the analysis function processor is configured to provide each of the plurality of analysis functions as an analysis function comprising the real part data and imaginary part data, wherein the correlator is configured to form a complex scalar product from the vibration signal and the complex analysis function, and wherein the correlator is configured to calculate an absolute magnitude of the complex scalar product as a correlation result for the analysis function.

12. A method for analyzing an element rotating at a rotational speed on the basis of a vibration signal originating from the rotating element, comprising:

forming a plurality of analysis functions, wherein each analysis function is formed based on an analysis frequency, based on the vibration signal or based on a measured or estimated rotational speed and based on a predetermined order factor, the predetermined order factor differing for each analysis function;

calculating a correlation function, wherein a correlation result is calculated from the vibration signal and each analysis function, each correlation result being associated to the order factor which the analysis function is based on with which the correlation result was calculated, and the correlation results representing the correlation function; and examining the correlation function or examining information derived from the correlation function in order to make a statement on a state of the rotating element, wherein at least one of the steps of forming, calculating, and examining is performed, at least in part, by a hardware implementation, wherein the forming comprises calculating the different analysis functions based on the following equation:

$$h(t,\tau,s)=\exp(j2\pi sft+jsr(t+\tau)),$$

h(t,τ,s) being the analysis functions, t being a time variable, τ being a time shift, s representing the predetermined order factor for each analysis function, f being an analysis frequency, and r(t+τ) being a phase term dependent on the vibration signal or the rotational speed, or wherein the calculating comprises: calculating a preliminary correlation function using a preliminary time shift between the vibration signal and the plurality of analysis functions, establishing a correction order factor of a local or global maximum of the preliminary correlation function, wherein the forming comprises calculating a plurality of correction analysis functions which are based on the same correction order factor and which comprise a different time shift, wherein the calculating comprises calculating a correction correlation function from the vibration signal and the plurality of correction analysis functions, and evaluating the correction correlation function in order to establish a maximum associated to a correction time shift, wherein the forming comprises calculating correction analysis functions using the correction time shift, and wherein the calculating comprises calculating the correlation function based on the correction analysis functions which are based on the correction time shift, wherein the examining comprises, in making the statement,
- finding out, whether the rotating element is defect or whether the rotating element works well, or
- generating a warning signal, or
- generating a control signal to the rotating element or to an element driving the rotating element or connected to the rotating element, or
- generating a brake signal for decelerating a vehicle comprising the rotating element, or
- generating a warning signal to a driver of a vehicle, containing an indication of not accelerating further or stopping as soon as possible.

13. A non-transitory digital storage medium having stored thereon a computer program for performing, when the computer program is run by a computer, a method for analyzing an element rotating at a rotational speed on the basis of a vibration signal originating from the rotating element, comprising:

forming a plurality of analysis functions, wherein each analysis function is formed based on an analysis frequency, based on the vibration signal or based on a measured or estimated rotational speed and based on a predetermined order factor, the predetermined order factor differing for each analysis function;

calculating a correlation function, wherein a correlation result is calculated from the vibration signal and each analysis function, each correlation result being associated to the order factor which the analysis function is based on with which the correlation result was calculated, and the correlation results representing the correlation function; and examining the correlation function or examining information derived from the correlation function in order to make a statement on a state of the rotating element, wherein the forming comprises calculating the different analysis functions based on the following equation:

$$h(t,\tau,s)=\exp(j2\pi sft+jsr(t+\tau)),$$

$h(t,\tau,s)$ being the analysis functions, t being a time variable, $\tau$ being a time shift, s representing the predetermined order factor for each analysis function, f being an analysis frequency, and $r(t+\tau)$ being a phase term dependent on the vibration signal or the rotational speed, or wherein the calculating comprises: calculating a preliminary correlation function using a preliminary time shift between the vibration signal and the plurality of analysis functions, establishing a correction order factor of a local or global maximum of the preliminary correlation function, wherein the forming comprises calculating a plurality of correction analysis functions which are based on the same correction order factor and which comprise a different time shift, wherein the calculating comprises calculating a correction correlation function from the vibration signal and the plurality of correction analysis functions, and evaluating the correction correlation function in order to establish a maximum associated to a correction time shift, wherein the forming comprises calculating correction analysis functions using the correction time shift, and wherein the calculating comprises calculating the correlation function based on the correction analysis functions which are based on the correction time shift, wherein the examining comprises, in making the statement,
- finding out, whether the rotating element is defect or whether the rotating element works well, or
- generating a warning signal, or
- generating a control signal to the rotating element or to an element driving the rotating element or connected to the rotating element, or
- generating a brake signal for decelerating a vehicle comprising the rotating element, or
- generating a warning signal to a driver of a vehicle, containing an indication of not accelerating further or stopping as soon as possible.

* * * * *